United States Patent
Ben David et al.

(10) Patent No.: US 9,667,117 B2
(45) Date of Patent: May 30, 2017

(54) MAGNETICALLY COUPLED FLYWHEEL

(71) Applicant: CHAKRATEC LTD., Lod (IL)

(72) Inventors: Ilan Ben David, Rosh Ha'ayin (IL); Nir Zohar, Rishon Lezion (IL); David Pincu, Holon (IL)

(73) Assignee: CHAKRATEC LTD., Lod (IL)

( * ) Notice: Subject to any disclaimer, the term of this patent is extended or adjusted under 35 U.S.C. 154(b) by 80 days.

(21) Appl. No.: 14/418,114

(22) PCT Filed: Jul. 24, 2013

(86) PCT No.: PCT/IL2013/050630
§ 371 (c)(1),
(2) Date: Jan. 29, 2015

(87) PCT Pub. No.: WO2014/020593
PCT Pub. Date: Feb. 6, 2014

(65) Prior Publication Data
US 2015/0162799 A1 Jun. 11, 2015

Related U.S. Application Data

(60) Provisional application No. 61/677,056, filed on Jul. 30, 2012, provisional application No. 61/722,174, (Continued)

(51) Int. Cl.
*H02K 7/02* (2006.01)
*F16F 15/30* (2006.01)
(Continued)

(52) U.S. Cl.
CPC ......... *H02K 7/025* (2013.01); *F16C 32/0402* (2013.01); *F16C 32/0446* (2013.01);
(Continued)

(58) Field of Classification Search
CPC  H02K 7/00; H02K 7/02; H02K 7/025; H02K 7/061; H02K 7/08; H02K 7/083;
(Continued)

(56) References Cited

U.S. PATENT DOCUMENTS 3,922,574 A * 11/1975 Whiteley ............... H02K 21/24
310/156.32
3,947,710 A * 3/1976 Miyamoto ............... F02P 1/00
123/149 D (Continued)

FOREIGN PATENT DOCUMENTS

DE          29923359      8/2000
JP          2003/219581   7/2003
(Continued)

OTHER PUBLICATIONS

European Search Report of European Application No. EP 13825526 mailed Jul. 22, 2016.
(Continued)

*Primary Examiner* — Michael Andrews
*Assistant Examiner* — Alexander Singh
(74) *Attorney, Agent, or Firm* — Pearl Cohn Zedek Latzer Baratz LLP

(57) ABSTRACT

A stabilization system for a rotating load, such as a flywheel, includes a mechanical bearing to continuously support a shaft of the rotating load so as to hold the shaft at a substantially fixed axis of rotation. A magnetic stabilization assembly includes a plurality of electromagnets arranged around the shaft. Control circuitry for controls a resultant magnetic field generated by the electromagnets such that the magnetic field acts on a ferromagnetic element of the shaft to reduce imbalance forces acting on the shaft.

14 Claims, 20 Drawing Sheets

Related U.S. Application Data filed on Nov. 4, 2012, provisional application No. 61/773,158, filed on Mar. 6, 2013.

(51) Int. Cl.
| | |
|---|---|
| *F16F 15/03* | (2006.01) |
| *H02K 7/09* | (2006.01) |
| *F16C 32/04* | (2006.01) |
| *F16F 15/315* | (2006.01) |
| *H02K 7/08* | (2006.01) |

(52) U.S. Cl.
CPC .......... *F16C 32/0451* (2013.01); *F16F 15/03* (2013.01); *F16F 15/30* (2013.01); *F16F 15/3156* (2013.01); *H02K 7/02* (2013.01); *H02K 7/09* (2013.01); *H02K 7/083* (2013.01); *Y02E 60/16* (2013.01)

(58) Field of Classification Search
CPC .......... H02K 7/085; H02K 7/09; H02K 21/22; H02K 21/222; F16C 32/0402; F16C 32/0406; F16C 15/30; F16C 32/0451; F16C 32/044632; Y02E 60/16; F16F 15/03; F16F 15/3156
USPC .............................. 310/74, 90.5, 153, 156.32
See application file for complete search history.

(56) References Cited

U.S. PATENT DOCUMENTS

| | | | |
|---|---|---|---|
| 4,286,475 A | 9/1981 | Friedericy et al. | |
| 5,124,605 A * | 6/1992 | Bitterly | F16C 32/044 152/73 |
| 5,471,106 A * | 11/1995 | Curtis | G01B 7/144 310/68 B |
| 5,495,221 A | 2/1996 | Post | |
| 5,568,023 A * | 10/1996 | Grayer | B60K 6/30 180/165 |
| 5,998,899 A | 12/1999 | Rosen et al. | |
| 6,203,924 B1 | 3/2001 | Smith | |
| 6,710,489 B1 | 3/2004 | Gabrys | |
| 2006/0255676 A1 | 11/2006 | Wise | |
| 2010/0263479 A1 | 10/2010 | Thompson et al. | |
| 2011/0231085 A1* | 9/2011 | Kim | B62D 37/06 701/124 |
| 2012/0013215 A1 | 1/2012 | Aronstam | |

FOREIGN PATENT DOCUMENTS

| | | |
|---|---|---|
| JP | 2011/097802 | 5/2011 |
| WO | WO-9303292 | 2/1993 |
| WO | WO-9527326 | 10/1995 |
| WO | WO-2010/145021 | 12/2010 |

OTHER PUBLICATIONS

International Search Report for International Application No. PCT/IL2013/050630 mailed Nov. 17, 2013.

\* cited by examiner

MAGNETICALLY COUPLED FLYWHEEL

CROSS-REFERENCE TO RELATED APPLICATIONS

This application is a National Phase Application of PCT International Application No. PCT/IL2013/050630, International Filing Date Jul. 24, 2013, claiming the benefit of U.S. Provisional Patent Application No. 61/677,056, filed Jul. 30, 2012, of U.S. Provisional Patent Application No. 61/722,174, filed Nov. 4, 2012, and of U.S. Provisional Patent Application No. 61/773,158, filed Mar. 6, 2013, each of which is hereby incorporated by reference.

FIELD OF THE INVENTION

The present invention relates to flywheels. More particularly, the present invention relates to a magnetically coupled flywheel.

BACKGROUND OF THE INVENTION

Electrical energy storage systems are of use both to producers and consumers of electrical energy. Storage systems for electrical energy may include storage batteries or other chemistry-based storage systems, capacitors or other electrically-based storage systems, thermal storage, or mechanical energy storage systems. Mechanical energy storage systems may include gravity-based storage systems, or inertial systems. Inertial systems may include flywheel systems.

A typical flywheel system consists of a flywheel in the form of a rotating mass that shares a common shaft with a rotor of a motor/generator unit. The rotating mass may include a material that is sufficiently dense and strong to effectively store the energy while remaining intact and operation. For example, the rotating mass may include steel, a composite material, or a combination of such materials. The motor/generator unit functions as a motor during a charge phase of the system and as a generator during a discharge phase.

During a charge phase, electrical power to be stored by the flywheel is provided to the motor/generator unit from a generating system or from an electrical grid in the form of an electrical current. The motor/generator unit then functions as an electrical motor. The current causes the rotor of the motor to generate a positive torque that provides angular acceleration to increase the rotational velocity, and thus the rotational kinetic energy, of the flywheel. The flywheel reaches a desired rotational velocity at which the flywheel is storing a desired quantity of energy. (Since rotational kinetic energy is proportional to the square of the angular velocity, flywheels are typically designed to spin at high speed.) The charge phase then ends.

After the charge phase, a store phase (typically longer than the charge phase) may begin. During the store phase, the motor/generator unit may be disconnected from any external electrical circuit, being thus placed in an idle mode. Thus, rotational inertia of the flywheel causes the flywheel to continue to rotate, storing the energy as rotational kinetic energy of the flywheel. During the store phase, various frictional forces may act to slow the speed of rotation of the flywheel and to cause loss of the stored energy. Therefore, during the store phase, current may be provided intermittently and for brief periods to the motor/generator unit to restore lost energy.

When power is to be extracted from the flywheel system, a discharge phase is entered. During a discharge phase, energy that is stored in the flywheel is converted to electrical power and made available for use (e.g., via an electrical power grid). The motor/generator unit is connected to an external electrical circuit and functions as a generator. Rotation of the flywheel turns the rotor of the generator and generates electrical power while applying a decelerating or braking force to the flywheel. The discharge phase may continue until there is no longer a need for the stored energy. The flywheel system may then revert to the store phase. In other cases, the rotational velocity of the flywheel may be reduced during the discharge phase to less than a minimum velocity (e.g., below which the system is no longer capable of generating usable electrical power). In this case the system may enter a wait phase.

During the wait phase, the flywheel may be stopped or may be rotating at a minimal velocity. The motor/generator is disconnected from external circuits and placed in an idle mode. The wait phase may continue until electrical energy is available to charge the flywheel again.

For an energy producer, energy storage enables provision of electrical power to the electrical grid at a constant rate. For example, the rate of generation of electricity using renewable sources such as solar, wind, or tidal power may vary as the power source varies. Thus, at times when electrical power production exceeds demand, excess produced energy may be stored. On the other hand, at times when demand for electrical power exceeds production, the stored energy may be provided to the electrical grid for use by consumers. Similarly, energy storage may enable electrical power production at a constant rate, regardless of momentary demand. Thus, electrical power may be generated without a need for (e.g., fuel based) generators that are operated only when demand is high (and may produce more carbon or pollutants than the generators that are operated constantly).

Similarly, a storage system may be used by a consumer to save energy costs. For example, the cost of electrical power from the grid may vary periodically. An electric power rate structure may charge more for electrical power during peak demand hours and less during off-peak hours (e.g., a rate during peak hours may be triple the rate during off-peak hours). A consumer with an energy storage system may thus buy electrical power during off-peak hours and use the saved energy during peak demand hours.

As compared with other energy storage techniques, systems, or methods, a flywheel provides some advantages. For example, the number of charge/discharge cycles is virtually unlimited, limited only by the wear of the mechanical parts. The amount and frequency of required maintenance may thus also be low as compared with other systems. Flywheel systems may also be relatively insensitive to environmental factors such as temperature changes. A flywheel system does not require use of hazardous materials, does not emit harmful gasses, and components of the system may be recyclable at the end of the useful life of the system.

SUMMARY OF THE INVENTION

There is thus provided, in accordance with an embodiment of the present invention, a stabilization system for a rotating load, the system including: a mechanical bearing to continuously support a shaft of the rotating load so as to hold the shaft at a substantially fixed axis of rotation; a magnetic stabilization assembly including a plurality of electromagnets arranged around the shaft; a control circuitry for controlling a resultant magnetic field generated by the electromagnets such that the magnetic field acts on a ferromagnetic element of the shaft to reduce imbalance forces acting on the shaft.

Furthermore, in accordance with some embodiments of the present invention, the ferromagnetic element includes a rotor ring.

Furthermore, in accordance with some embodiments of the present invention, the system includes a sensor to sense a vibration of the shaft, the control circuitry being configured to control the resultant magnetic field so as to minimize the sensed vibration.

Furthermore, in accordance with some embodiments of the present invention, the control circuitry includes an H-bridge or a power amplifier to drive the electromagnets to generate a desired magnetic field.

Furthermore, in accordance with some embodiments of the present invention, the control circuitry is configured to compensate for a previously measured variation in a dimension of a mechanical component.

Furthermore, in accordance with some embodiments of the present invention, the rotating load includes a flywheel for storing energy.

Furthermore, in accordance with some embodiments of the present invention, the mechanical bearing includes a bearing selected from a group of bearings consisting of a metal ball bearing, a hybrid ball bearing, and a ceramic ball bearing There is further provided, in accordance with some embodiments of the present invention, a flywheel energy storage system including a flywheel within an evacuable enclosure, the flywheel including a core rotatable about an axis of rotation and a plurality of rods, a proximal end of each rod being attached to a periphery of the core, the rods extending substantially radially with respect to the axis of rotation.

Furthermore, in accordance with some embodiments of the present invention, the rods are attached to the periphery of the core in a staggered pattern.

Furthermore, in accordance with some embodiments of the present invention, each proximal end is attached to the periphery of the core by holder that is configured to hold the proximal end by a mechanism selected from a group of holding mechanisms consisting of a press fit, a self-locking wedge, high shear-stress glue, and a collapsible ferrule.

Furthermore, in accordance with some embodiments of the present invention, a distal end of a rod of said plurality of rods is weighted.

Furthermore, in accordance with some embodiments of the present invention, a rod of the plurality of rods includes fiberglass.

Furthermore, in accordance with some embodiments of the present invention, a rod of the plurality of rods includes a bundle of fibers wrapped around a column.

There is further provided, in accordance with some embodiments of the present invention, a flywheel energy storage system including: a DC bus; a plurality of flywheels; a plurality of motor/generator units, each motor/generator unit being rotatably coupled to a flywheel; a plurality of controller/inverters, each controller/inverter being electrically coupled to a motor/generator unit and to the DC bus; and a central controller to control each controller/inverter so as to set a discharge rate for each of the flywheels when its motor/generator unit is operating in a discharge mode, and to increase a voltage level of a voltage signal generated by the motor/generator unit in the discharge mode.

Furthermore, in accordance with some embodiments of the present invention, a controller/inverter includes an H-bridge circuit.

Furthermore, in accordance with some embodiments of the present invention, the central controller is configured to control a controller/inverter of the plurality of controller/inverters to operate in a discharge mode while concurrently controlling another controller/inverter of the plurality of controller/inverters to operate in a charge mode.

There is further provided, in accordance with some embodiments of the present invention, a flywheel energy storage system for storing electrical energy, the system including: a flywheel with a rotatable mass and a shaft, the flywheel being enclosed within an evacuable enclosure, the shaft supported by bearings on opposite sides of the rotatable mass; and an electric motor/generator unit having a stator and a rotor, the rotor being fixed to the shaft in a cantilevered manner within the enclosure and being magnetically coupled to the stator, the stator being located outside of the enclosure.

Furthermore, in accordance with some embodiments of the present invention, a distance between the rotor and the stator is adjustable.

Furthermore, in accordance with some embodiments of the present invention, the stator is configured to couple to each of a plurality of rotors.

Furthermore, in accordance with some embodiments of the present invention, the flywheel includes lead enveloped in a shell that includes carbon fiber.

Furthermore, in accordance with some embodiments of the present invention, the flywheel includes a plurality of glass fibers, each fiber being at least partially wrapped around a column of a plurality of columns that are arranged in a circular pattern that is centered on an axis of rotation of the flywheel, such that each fiber extends substantially radially outward from the axis when the flywheel rotates.

Furthermore, in accordance with some embodiments of the present invention, the flywheel includes a structure with an eccentric mass distribution that is rotatable to adjust a balance of the flywheel.

Furthermore, in accordance with some embodiments of the present invention, section of the enclosure between the rotor and the stator includes glass.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
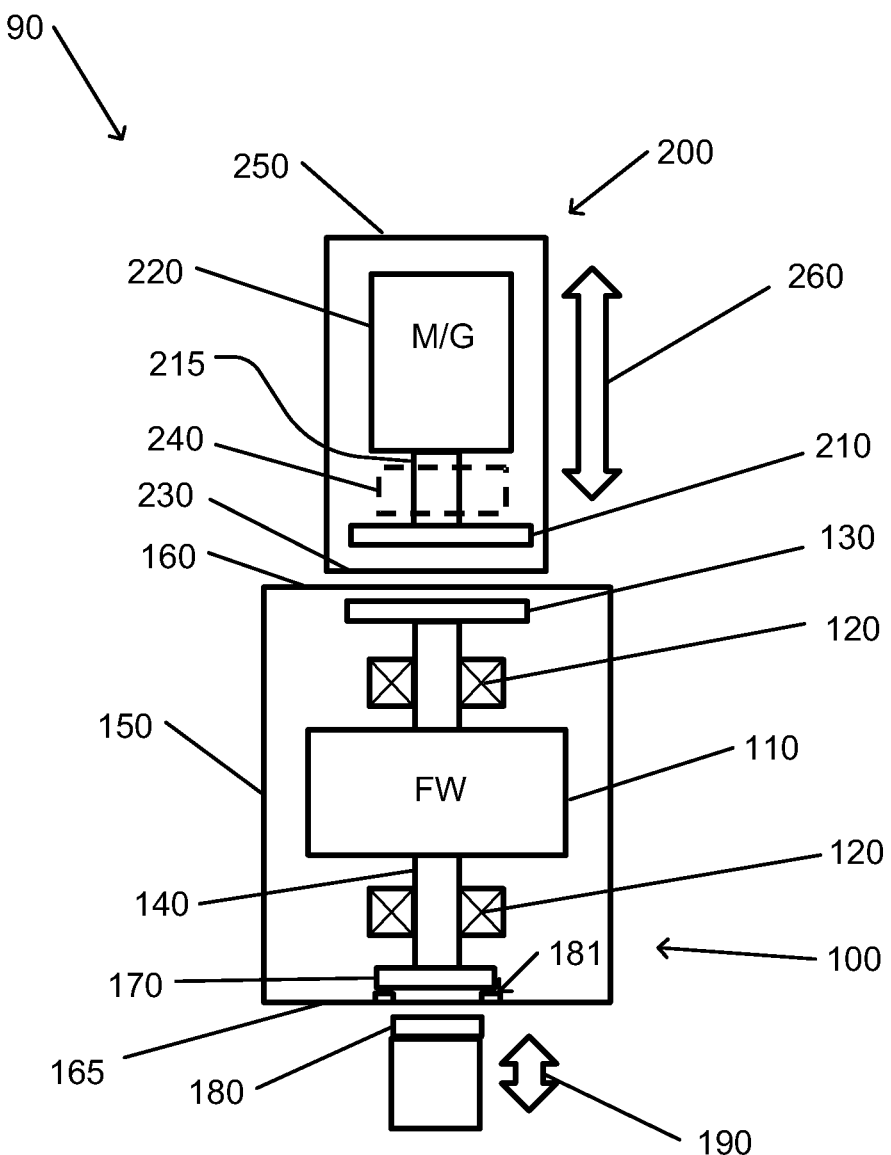
FIG. 1 schematically illustrates a flywheel energy storage system with a flywheel magnetically coupled to a rotor of a motor/generator unit, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

In accordance with embodiments of the present invention, a flywheel energy storage system includes a flywheel. The flywheel, as well as any shaft, axle, or other rotating component that is rotatable together with the flywheel, is enclosed within a vacuum enclosure. Air, or other gaseous or fluid contents of the vacuum enclosure, may be evacuated to form a vacuum within the vacuum enclosure.

Enclosing the flywheel within vacuum that is formed within an evacuated vacuum chamber may be advantageous. Operating the flywheel in a vacuum minimizes air drag on rotating components of the flywheel.

In accordance with embodiments of the present invention, some or all components of a motor/generator unit of the flywheel energy storage system are located outside of the vacuum enclosure. For example, the entire motor/generator unit may be located outside of the vacuum enclosure. As another example, a stator of the motor/generator unit may be located outside of the vacuum enclosure, while a rotor of the motor/generator unit is located within the vacuum enclosure.

Placement of the motor/generator unit outside of the vacuum enclosure may be advantageous as compared with a system in which the motor/generator unit is also enclosed within a vacuum enclosure. For example, placement of the motor/generator unit outside of the vacuum may enable a motor/generator unit to be movable among an array of enclosed flywheels. Thus, the movable motor/generator unit may be coupled at different times to different flywheels in the array. In this manner, by reducing the number of required motor/generator units, cost of a multiple flywheel system may be reduced (relative to a system that requires a dedicated motor/generator unit for each flywheel). Furthermore, placement of the motor/generator unit outside of the vacuum enclosure may simplify cooling of the motor/generator unit (e.g., by enabling convection or conductive cooling).

In accordance with embodiments of the present invention, the flywheel is coupled to the motor/generator unit via magnetic coupling. Magnetic coupling of the flywheel to the motor/generator unit may be advantageous. Magnetic coupling eliminates any requirement for vacuum sealing about the flywheel shaft that could introduce mechanical friction on the shaft.

Magnetic coupling may include coupling a rotating first magnetic element of the flywheel that rotates together with the flywheel to a second magnetic element that rotates together with the rotor of the motor/generator unit. In this case, the rotor of the motor/generator unit is located outside of the vacuum enclosure. Magnetic coupling in this case may enable the motor to stop rotating when in an idle mode. For example, the first and second magnetic elements may be moved apart to decouple the rotations. This may reduce wear of the rotating components and bearings of the motor/generator unit, as well as reducing losses caused by eddy currents and by hysteresis within the iron core of the stator.

Magnetic coupling may include an electromagnetic interaction between a rotor of the motor/generator unit that rotates together with the flywheel (e.g., at the end of a shaft of the flywheel inside the vacuum enclosure) with a stator of the motor/generator unit that is located outside of the vacuum enclosure.

The mass of the flywheel may be greater than 50 kg. More specifically, the mass may be in the range of 100 kg to 200 kg.

FIG. 1 schematically illustrates a flywheel energy storage system with a flywheel magnetically coupled to a rotor of a motor/generator unit, in accordance with an embodiment of the present invention.

Flywheel energy storage system 90 includes a flywheel unit 100 and a motor/generator unit 200.

Flywheel unit 100 includes flywheel 110. Flywheel 110 includes a mass that is rotatable about flywheel shaft 140. Flywheel shaft 140 is supported by bearings 120. For example, bearings 120 may include ball bearings made, e.g., of steel or of ceramic materials, magnetic bearings, a combination of magnetic bearings and ball bearings, or another type of bearing. Flywheel shaft 140 and flywheel 110 are rotatable at a high angular velocity within vacuum enclosure 150.

Flywheel shaft 140 is provided with flywheel magnetic coupling plate 130 at an end of flywheel shaft 140 that is proximal to motor/generator unit 200. Flywheel magnetic coupling plate 130 is mounted in a cantilevered manner to flywheel shaft 140. As used herein, cantilevered attachment or mounting of an object (e.g., a coupling plate or rotor) to a shaft indicates that the object is supported only by the shaft, without any support on the side of the object opposite the side from which the shaft extends. Flywheel magnetic coupling plate 130 may include one or more magnets, or a ferromagnetic material that is attracted to a magnet on motor/generator magnetic coupling plate 210 of motor/generator unit 200. The magnets may include permanent magnets or electromagnets. The magnets may be embedded or enclosed within flywheel magnetic coupling plate 130 or may be mounted to a surface of flywheel magnetic coupling plate 130. Alternatively or in addition to being mounted at an end of flywheel shaft 140, a magnetic coupling plate may be mounted directly to flywheel 110 or to another component of flywheel unit 100 that rotates with the same rotational velocity as flywheel 110.

Flywheel magnetic coupling plate 130 may be operated to function as part of a magnetic coupling to motor/generator unit 200. For example, flywheel magnetic coupling plate 130 may be coupled to motor/generator magnetic coupling plate 210 of motor/generator unit 200. Motor/generator magnetic coupling plate 210 may include one or more magnets, or a ferromagnetic material that is attracted to a magnet on flywheel magnetic coupling plate 130. Motor/generator magnetic coupling plate 210 may be configured to be rotatable with a rotor of motor/generator 220. Flywheel magnetic coupling plate 130 may be positioned close to (e.g., within a few tenths of a millimeter of) coupling cover 160 of vacuum enclosure 150. Similarly, motor/generator magnetic coupling plate 210 may be positioned close to (e.g., within a few tenths of a millimeter of) coupling cover 230 of motor/generator unit enclosure 250. High-torque magnetic coupling devices are known in the art and are commercially available.

All or part of coupling covers 160 and 230 may be constructed of a magnetically susceptible material that enables magnetic coupling between flywheel magnetic coupling plate 130 and motor/generator magnetic coupling plate 210. For example, coupling cover 160 or 230 may include aluminum, glass, plastic, or another magnetically susceptible material.

Motor/generator magnetic coupling plate 210 may be connected to shaft 215 of motor/generator unit 200. Shaft 215 may be connected (directly or indirectly, e.g., via a transmission 240) to a rotor of motor/generator 220.

In accordance with some embodiments of the present invention, motor/generator unit 200 may be enclosed within motor/generator enclosure 250. Motor/generator enclosure 250 may be sealed so as to isolate motor/generator 220 from the ambient environment. In this case, motor/generator enclosure 250 may be evacuated or filled with a rarified gas (e.g., air).

In accordance with other embodiments of the present invention, motor/generator 220 and motor/generator magnetic coupling plate 210 (and transmission 240) may be open to the ambient atmosphere. Exposing motor/generator 220 to the atmosphere may enable use of standard components in motor/generator unit 200. Furthermore, Exposing motor/generator 220 to the atmosphere may simplify cooling of motor/generator 220 (e.g., using standard air or liquid convection or conduction techniques) and may eliminate any need for handling outgassing of components as could be required in a sealed enclosure.

Flywheel energy storage system 90 may be provided with a mechanism to enable gradual engagement or disengagement of flywheel magnetic coupling plate 130 with motor/generator magnetic coupling plate 210. For example, the gradual engagement/disengagement mechanism, as represented by engagement/disengagement movement 260, may enable movement of motor/generator magnetic coupling plate 210 toward or away from flywheel magnetic coupling plate 130. The engagement/disengagement mechanism may align the axis of rotation of motor/generator magnetic coupling plate 210 with the axis of rotation of flywheel magnetic coupling plate 130 while a separation distance between the plates is too large to enable magnetic coupling (e.g., during a store or wait phase). Engagement/disengagement movement 260 may be applied to gradually shorten the separation distance. As the distance is reduced slowly, motor/generator magnetic coupling plate 210 gradually engages flywheel magnetic coupling plate 130 while one of the plates is rotating at high speed. For example, a speed of rotation of a rotor of motor/generator 220 may be controlled to match a rotational speed of flywheel magnetic coupling plate 130 during, or prior to, engagement.

As another example, at the start of a charge phase, motor/generator magnetic coupling plate 210 may be rotating faster than flywheel magnetic coupling plate 130. On the other hand, at the start of a discharge phase, flywheel magnetic coupling plate 130 may be rotating faster than motor/generator magnetic coupling plate 210. Gradual engagement causes the rotational velocity of the more slowly rotating plate to gradually increase until the rotational velocities of the two plates are approximately equal.

Alternatively or in addition, the rotor of motor/generator 220 (and motor/generator magnetic coupling plate 210) may be angularly accelerated (e.g., by motor operation of motor/generator 220) to a rotation velocity that is close to that of flywheel magnetic coupling plate 130. Engagement/disengagement movement 260 may then be operated to reduce the separation distance between motor/generator magnetic coupling plate 210 and flywheel magnetic coupling plate 130 until the plates engage one another.

Placement of motor/generator unit 200 outside of flywheel vacuum enclosure 150 may enable use of different motor/generator units 200 with a single flywheel unit 100. For example, different motor/generator units may be distinguished from one another by different gear ratios (e.g., a high ratio reduction gear for high speed operation of flywheel 110, and a low reduction ratio or no gear at all for lower speed operation of flywheel 110).

Placement of the motor/generator unit outside of flywheel vacuum enclosure 150 may enable use of separate motors or generators in place of a single device with both motor and generator capabilities. Each separate motor or generator device may be used during the appropriate phase of operation of a flywheel energy storage system. Such separate motors and generators may be less expensive and simpler than a single device with capabilities of both.

In accordance with some embodiments of the present invention, flywheel unit 100 may include magnetic thrust bearings. The magnetic thrust bearings are configured to counter any axial forces that are applied to flywheel shaft 140 during operation of flywheel energy storage system 90. For example, the magnetic thrust bearings may operate on magnetic plate 170. Magnetic plate 170 is attached to an end of flywheel shaft 140 that is distal to motor/generator unit 200. Magnetic plate 170 may be permanently magnetized (e.g., is made of or includes soft iron or another ferromagnetic material). Magnetic plate 170 may rotates at the same high rotational velocity as flywheel 110. Therefore, the permanent magnets of magnetic plate 170 may be encapsulated so as to prevent disintegration or rupture of magnetic plate 170 when spinning at high speed. The encapsulation may be made from carbon fiber composite or from nonmagnetic metal.

The magnetic thrust bearings may include permanent magnets 181 that are located on rear plate 165 of flywheel vacuum enclosure 150. Permanent magnets 181 may include ring magnets that are arranged concentrically about the longitudinal axis of flywheel shaft 140, or block or cylindrical magnets that are arranged in a circular pattern.

Permanent magnets 181 are configured to repel the magnets on magnetic plate 170. Thus, when magnetic plate 170 is placed at the bottom end of a vertically oriented flywheel shaft 140, permanent magnets 181 and magnetic plate 170 cooperate to at least partially support the weight of flywheel 110 (and thus reduce stress on bearings 120). Similarly, in an inverted system (e.g., where gravity may tend to increase the distance between magnetic plate 170 and permanent magnets 181), permanent magnets 181 may be configured to attract the magnets (or a ferromagnetic material) on magnetic plate 170.

In accordance with some embodiments of the present invention, adjustment device 180 may be provided to enable fine adjustment of the equilibrium position of flywheel shaft 140. For example, such fine adjustment may enable compensation for changes in the effective weight of flywheel 110 with regard to bearings 120. For example, when motor/generator magnetic coupling plate 210 engages flywheel magnetic coupling plate 130, an axial force may be exerted on flywheel shaft 140. Adjustment device 180 may include a magnet (e.g., permanent magnet or electromagnet). For example, the magnet of adjustment device may be configured to repel or attract magnetic plate 170 (depending on the configuration of flywheel energy storage system 90). Adjustment movement 190 may be applied to adjustment device 180 to adjust the force that is exerted on magnetic plate 170 so as to counteract a force that is exerted by motor/generator magnetic coupling plate 210 on flywheel magnetic coupling plate 130. Adjustment movement 190 and engagement/disengagement movement 260 may be controlled by single controller that is configured to coordinate the movements with one another (and thus maintain a constant axial force on flywheel shaft 140).

In accordance with some embodiments of the present invention, a flywheel energy storage system may include a plurality of flywheel units, each enclosed in a separate vacuum enclosure. Placement of the motor/generator unit outside of flywheel vacuum enclosure 150 may enable moving a single motor/generator unit 200 from one flywheel unit to another. Thus a single motor/generator unit 200 may be shared by several of the flywheel units. The cost of such a system may thus be reduced.

For example, a flywheel unit with a steel flywheel rotor, e.g., with a mass of about 400 kg and rotating at a speed of about 15,000 revolutions per minute (rpm) may store about one kilowatt-hour (kWh) of energy. If greater energy-storage capacity is required, then multiple flywheel units may be provided.

Figure 2:
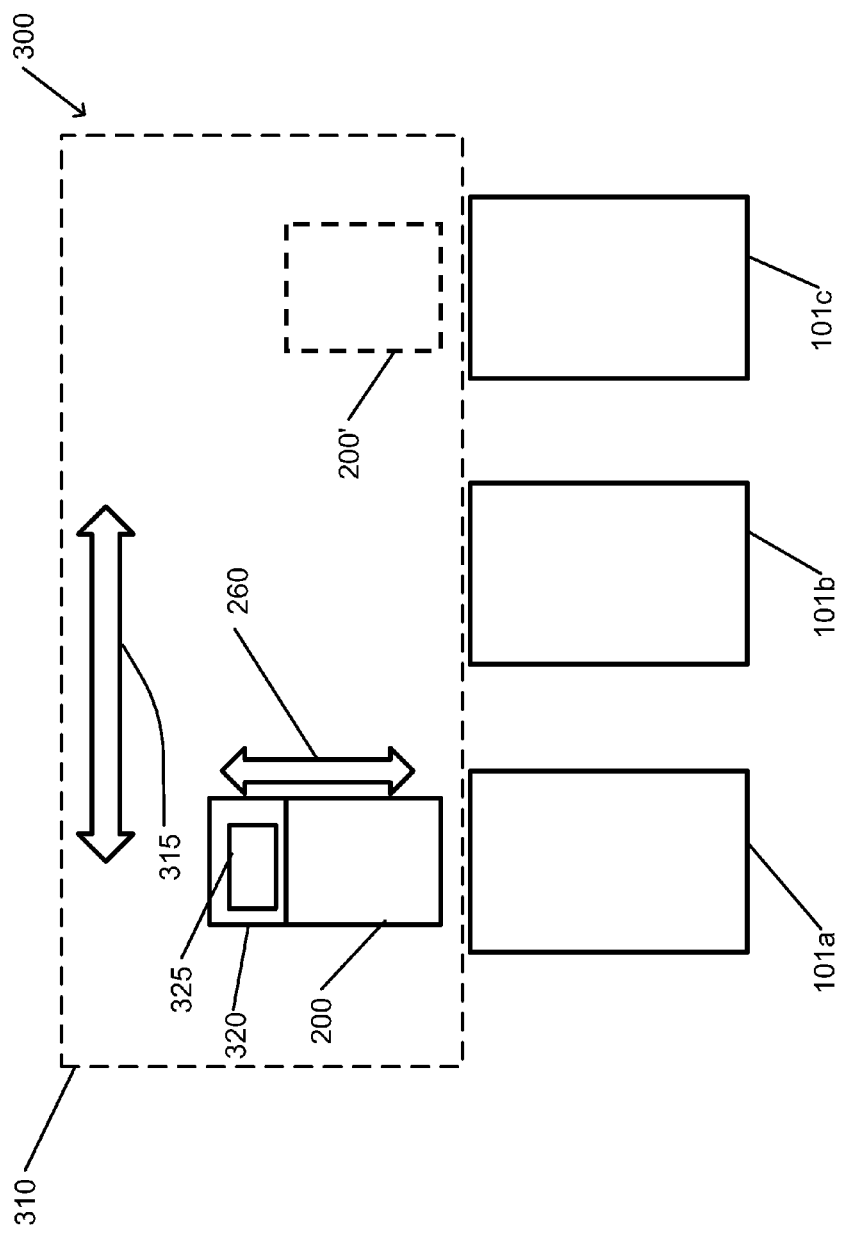
FIG. 2 schematically illustrates sharing of a single motor/generator unit by a plurality of flywheel units of a flywheel energy storage system, in accordance with an embodiment of the present invention.

FIG. 2 schematically illustrates sharing of a single motor/generator unit by a plurality of flywheel units of a flywheel energy storage system, in accordance with an embodiment of the present invention.

Multiple flywheel energy storage system 300 includes a plurality of flywheel units 101a-101c, shown as arranged in a single row (more than one row of flywheel units may be included). Each row of flywheel units 101a-101c is provided with a single motor/generator system 310, controlled by system controller 325. Controller 325 is configured to operate in accordance with programmed instructions.

For example, controller 325 may be configured to wait for a command from a main controller. When the command is received, controller 325 causes movement control system 315 to connect the motor/generator unit 200 to flywheel unit 101a. An indication may be received that motor/generator unit 200 is correctly placed and has engaged successfully flywheel unit 101a. Controller 325 then operates motor/generator unit 200 in a motor mode to accelerate the flywheel of flywheel unit 101a. Controller 325 monitors the speed of one or both of the motor/generator and the flywheel. When the monitored speed is within a pre-determined threshold of the target speed, power to motor/generator unit 200 is discontinued. Controller 325 the causes movement control system 315 to disengage the motor/generator unit 200 from flywheel unit 101a.

Once movement control system 315 indicates successful disengagement, and if more of flywheel units 101b or 101c are to be energized, e.g., flywheel unit 101c, controller 325 may cause movement control system 315 to move motor/generator unit 200 to flywheel unit 101c (as indicated by motor/generator unit 200'). The preceding process is then repeated until all flywheel units are spinning at a target angular velocity (and multiple flywheel energy storage system 300 is storing quantity of energy equal to its full capacity), or power is to be extracted from the system.

When the energy stored in multiple flywheel energy storage system 300 is approximately equal to the system's capacity, motor/generator unit 200 may be disengaged from all of flywheel units 101a-101c. Motor/generator unit 200 may be positioned at a standby location. Alternatively or in addition, motor/generator unit 200 may remain near one of flywheel units 101a-101c but in an idle mode. Thus, if power is to be provided from the flywheel, motor/generator unit 200 may be placed in a generator mode, thus providing uninterrupted power supply (UPS) functionality.

When power is to be extracted from the multiple flywheel energy storage system 300 array, controller 325 may cause movement control system 315 to position a motor/generator unit 200 to engage one of flywheel units 101a-101c (e.g., 101a). Motor/generator unit 200 engages the flywheel unit (e.g., 101a) and operates in a generator mode.

When engaging the flywheel unit (e.g., 101a), a rotor of motor/generator unit 200 accelerates to the speed of the flywheel of the flywheel unit (e.g., 101a). Electrical power is then generated. The electrical power varies in frequency and amplitude as the rotation of the flywheel decelerates. Thus, signal conditioning may be provided prior to feeding the generated power into a power grid. For example, motor/generator unit 200 may be associated with power converter 320. Power converter 320 may be incorporated into, mounted on, or located near motor/generator unit 200.

The output signal of power converter 320 may be at a level that enables the signal to be connected to a common power bus. The common power bus may aggregate electrical power that is generated by a plurality of motor/generator units of a multiple flywheel energy storage system 300.

In accordance with another embodiment of the present invention, separate motor and generator units may be provided. The motor or generator unit may be moved separately throughout an array of flywheel units by a movement control system.

In accordance with another embodiment of the present invention, a motor/generator unit may be provided with a variable transmission (e.g., a gear box). The variable transmission may be controlled to reduce or increase a difference in rotational velocity between the motor/generator unit and the flywheel of a flywheel unit. This may enable use of high-efficiency or low-cost commercially available devices that are not capable of operating at the high speed at which the flywheel is rotating.

In accordance with another embodiment of the present invention, flywheel units are arranged in two or more arrays. This may allow for continuous provision of energy during operation of a multiple flywheel energy storage system. For example, the motor/generator unit of one array may be engaged and operating while the motor/generator unit of the other array is disengages. Alternatively or in addition, the system can be constructed that at least two motor/generator units are movable throughout a single array of flywheels units. Flywheel modules may be arranged in a linear, circular, curved, or other arrangement, or in the form of a two- or three-dimensional matrix.

In accordance with an embodiment of the present invention, a transmission (e.g., transmission 240 as shown in FIG. 1) may be utilized to enable the flywheel to rotate at a higher angular velocity and exerting a low torque to engage a motor/generator unit whose rotor is rotating at a lower angular velocity and with a large torque. For example, a rotor of a motor/generator unit may rotate at 6,000 rpm while engaging a flywheel that is rotating at 60,000 rpm or more. Such transmissions are known in the art and are commercially available. The transmission may include mechanical components (e.g., gears) or may be based on magnetic interactions.

In accordance with an embodiment of the present invention, various motor/generator units of a flywheel energy storage system may be provided with different transmissions 240. Each transmission 240 may provide a different transmission ratio. For example, a motor/generator unit having a transmission 240 that provides a transmission ratio of 1:3 could be used when the angular velocity of the flywheel is less than about 15,000 rpm. Another motor/generator unit may include a transmission 240 that provides a transmission ration of 1:6 may be used for flywheel rotations for up to 60,000 rpm or more. Other transmission ratios may be used.

In accordance with some embodiments of the present invention, a magnetic coupling between a flywheel unit and a motor/generator unit may provide function of a reduction gear or transmission.

Figure 3:
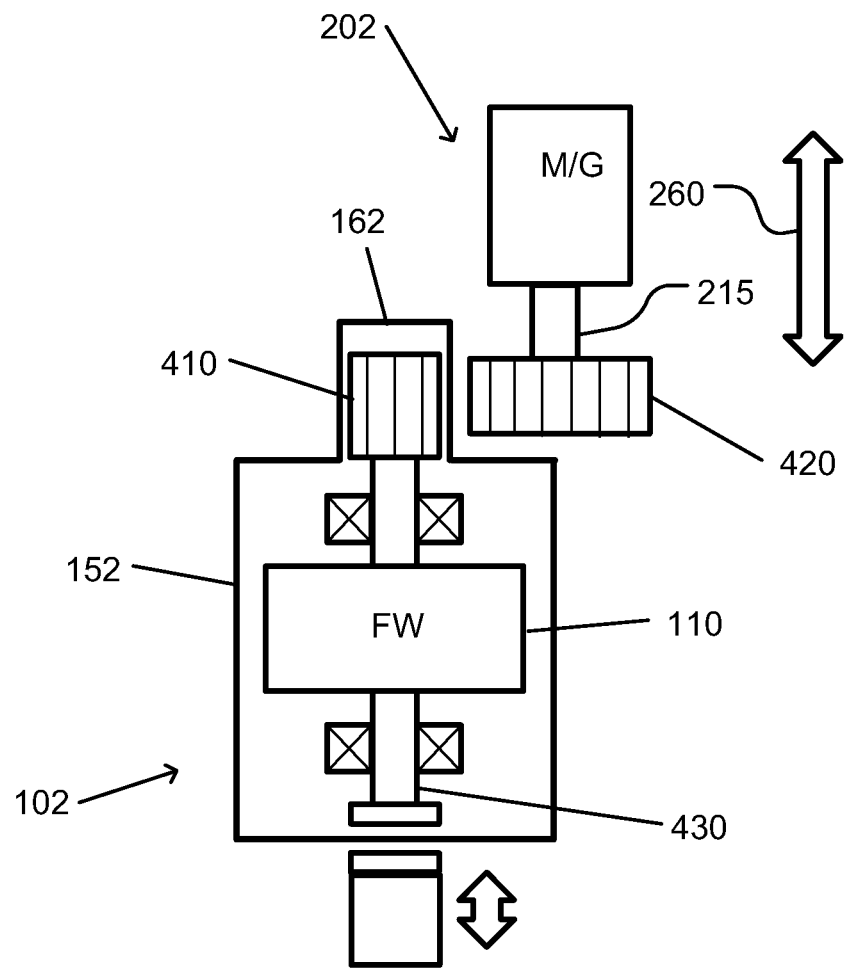
FIG. 3 schematically illustrates a flywheel energy storage system with magnetic reduction transmission, in accordance with an embodiment of the present invention.

FIG. 3 schematically illustrates a flywheel energy storage system with magnetic reduction transmission, in accordance with an embodiment of the present invention.

Magnetic pinion 410 is mounted on flywheel shaft 430 of flywheel unit 102. Thus, magnetic pinion 410 rotates together with flywheel 110. Cap 162 of vacuum enclosure 152 is placed near (e.g., within a few tenths of a millimeter) magnetic pinion 410 and is made of a magnetically susceptible material. Thus, magnetic pinion 410 may be magnetically coupled laterally to magnetic gear 420 of motor/generator unit 202. Magnetic gear 420 may be connected, via shaft 215 to a rotor of motor/generator unit 202. Engagement/disengagement movement 260 may be operated to cause magnetic gear 420 to magnetically engage magnetic pinion 410.

Magnetic gear 420 may typically have a larger radius than magnetic pinion 410. Thus, when magnetically coupled with one another, flywheel 110 may rotate faster than the rotor of motor/generator unit 202. Thus, the magnetic coupling between magnetic gear 420 and magnetic pinion 410 may provide the function of a reduction gear.

Other configurations that provide both magnetic coupling and reduction transmission are possible. For example, the magnetic gear of the motor/generator unit may have an annular configuration within which magnetic pinion 410 may rotate.

The maximum angular velocity at which a flywheel may safely spin may depend on the material from which the flywheel is constructed (e.g., the tensile strength of the material) and its structure. For example, a flywheel that is constructed from steel may be limited to a maximum angular velocity of about 20,000 rpm. A flywheel rotor may be constructed using composite materials (e.g., having a lower density than steel but a much higher tensile strength). A flywheel constructed using a composite material may have a maximum angular velocity of about 50,000 rpm or more.

Carbon fibers having high tensile strength have been used to form a flywheel rotor assembly. Such flywheels have been known to fail by a laminate disintegration mechanism due to the low sheer and tensile strength of an epoxy adhesive matrix used to bond layers of the carbon fibers.

In accordance with an embodiment of the present invention, a flywheel rotor may be constructed using carbon fibers in which carbon nano-tubes are added to an adhesive epoxy resin. The nano-tubes may increase the interlaminate strength of the composite material, and may thus enable the rotor to operate at high rotational velocities without disintegration.

In accordance with an embodiment of the present invention, a flywheel rotor may be constructed with a low-density outer shell with high tensile strength that envelopes a high-density inner core having lower tensile strength. Such a flywheel may be rapidly rotated without causing disintegration of the high-density material.

Figure 4:
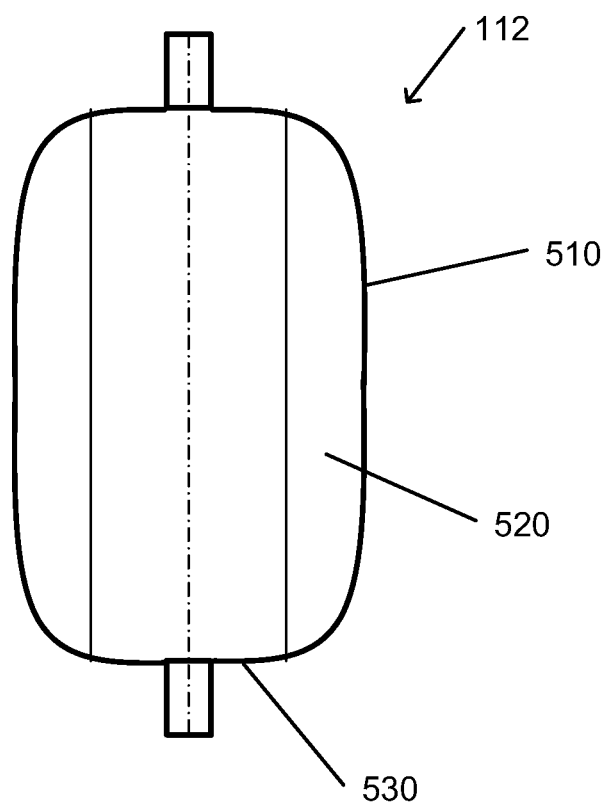
FIG. 4 schematically illustrates a flywheel with a shell construction, in accordance with an embodiment of the present invention.

FIG. 4 schematically illustrates a flywheel with a shell construction, in accordance with an embodiment of the present invention.

Flywheel 112 includes an outer shell 510 that envelopes an inner shell 520. Outer shell 510 and inner shell 520 surround inner core 530.

Outer shell 510 is constructed to have a high tensile strength. For example, outer shell 510 may include a carbon fiber composite material having a high tensile strength by inclusion of carbon nano-tubes in the epoxy resin used to bond the material. Thus, outer shell 510 may withstand the very high tensile stress caused by high speed rotation of flywheel 112.

Inner shell 520 may include a high density material. The high density material in inner shell 520 may be included to increase the moment of inertial of flywheel 512.

For example, high density material in inner shell 520 may include lead. Lead may be cast using centrifugal casting into outer shell 510 which serves as a cast mold. (As opposed to traditional centrifugal casting, the cast mold is not removed after casting.) In this manner, lead, which exhibits a relatively low tensile strength but has a high density, may be utilized to increase the mass (and thus the moment of inertia) of inner shell 520 and of flywheel 112. The composite material in surrounding outer shell 510 prevents the lead in inner shell 520 from disintegrating during high-speed rotation of flywheel 112. Other combinations of materials may be used.

Due to the high cost of carbon fiber, a flywheel may be designed to limit the quantity of high tensile strength material that is incorporated into the flywheel while providing a sufficiently large moment of inertia. The design may also reduce the risk of catastrophic failure of the flywheel during high-speed rotation. In accordance with an embodiment of the present invention, the flywheel may include radially projecting rods.

Figure 5A:
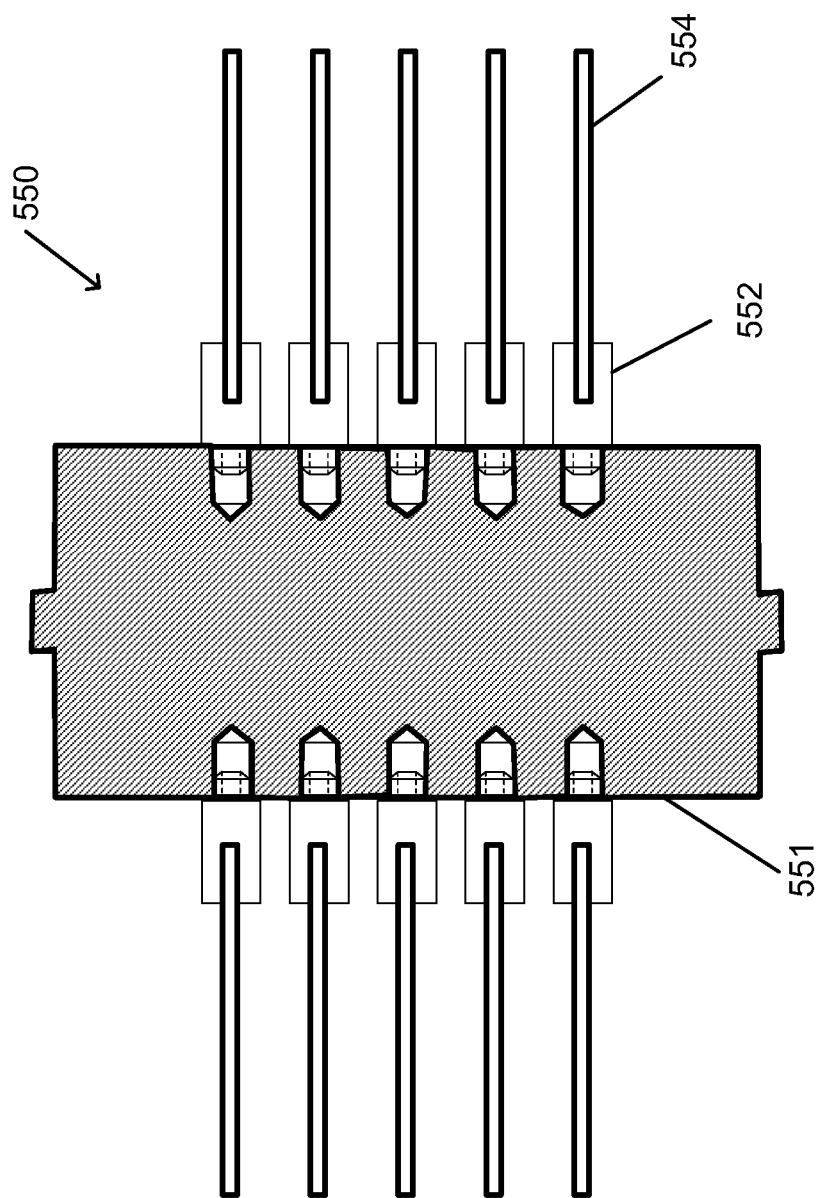
FIG. 5A schematically illustrates a brush-like flywheel that includes radially projecting rods, in accordance with an embodiment of the present invention.

FIG. 5A schematically illustrates a brush-like flywheel that includes radially projecting rods, in accordance with an embodiment of the present invention.

Brush-like flywheel 550 includes flywheel core 551 from whose periphery projecting rods 554 extend radially. (Extending from the periphery is used herein to exclude a configuration in which both ends of a single rod that is inserted into a core extend outward on different sides of the core.) For example, flywheel core 551 may be made of steel or another dense material.

Projecting rods 554 may include fiberglass. Fiberglass, although exhibiting high tensile strength (S-glass has a specific strength that is greater than that of carbon fiber), is deformable (exhibiting large strain when subjected to a stretching force, being characterized by a low specific modulus relative to carbon fiber and many other materials). Therefore, dimensions of an enclosure that encloses brush-like flywheel 550 may be sufficiently large to accommodate stretching of projecting rods 554.

For example, the rod may be subjected to a pultrusion process in which the glass fiber bundles are immersed in a matrix material and pulled through a heated die. The glass fibers may include a large number of micro-fibers, for example, each having a diameter in a range of 7 μm to 20 μm. This pultrusion process creates a high-density high-strength rod that has an axial structure (all fiber bundles being aligned essentially parallel to the rod axis). The matrix material is of a thermosetting nature. Thus, the matrix material is cured during its passage through the heated die. The rigidity of the resulting rods is substantially increased by the pultrusion process. Thus, the pultrusion processing may enable use of relatively low cost materials, such as S-glass or E-glass, that could not be used otherwise.

Interlayer shear strength of the rod construction may be increased by the addition of carbon nano-tubes into the matrix material. An optimal type and quantity of nano-tubes to be added may be determined by testing. For example, carbon nano-tubes may make up 0.03% by weight of the matrix material. In some cases, measured rod strength has been found to increase by 20%-30% as a result of addition of carbon nano-tubes.

For example, projecting rods 554 made out of fiberglass may each have a diameter as large as about 100 mm, or a typical value of about 12 mm, or another diameter.

Projecting rods 554 may be attached to the periphery of the flywheel core in a staggered pattern or arrangement. A staggered arrangement may increase uniformity of stress distribution and reduce maximal stress in flywheel core 551.

Figure 5B:
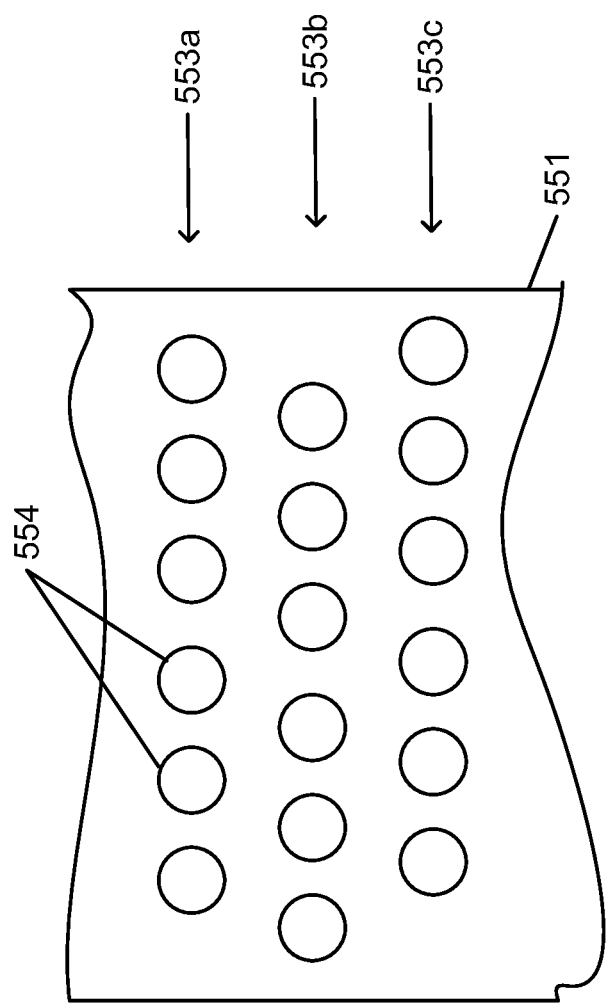
FIG. 5B schematically illustrates a staggered arrangement of rods of the brush-like flywheel shown in FIG. 5A.

FIG. 5B schematically illustrates a staggered arrangement of rods of the brush-like flywheel shown in FIG. 5A. In the staggered arrangement shown, projecting rods 554 (viewed head on) that extend from the periphery of flywheel core 551 are arranged in rows 553a-553c. Rows 553a-553c are staggered with respect to one another such that, for example, row 553b is shown as laterally displaced with respect to row 553a and 553b. Other staggered arrangements of projecting rods 554 on flywheel core 551 are possible.

Brush-like flywheel 550 is operated in an evacuated vacuum enclosure (e.g., flywheel vacuum enclosure 150 as shown in FIG. 1). Operation in an evacuated enclosure eliminates or reduces aerodynamic drag on projecting rods 554. During rotation of brush-like flywheel 550 about its axis, projecting rods 554 are subjected to uniaxial loading due to the centrifugal force and their length increases. For example, each projecting rod 554 may extend by 1-2% of its length (such that each projecting rod 554 is about half a meter long, the diameter of brush-like flywheel 550 may increase by one or two centimeters) when rotating at full speed. Therefore, the vacuum enclosure is designed with sufficient diameter to prevent the distal tips of projecting rods 554 from coming into physical contact with the enclosure.

Projecting rods 554 are connected to the periphery of core 551 by rod holders 552. For example, a proximal end of rod holder 552 may be attached (e.g., screwed or glued into, or otherwise secured) to core 551, e.g., into a tapped hole on core 551 (the tapped hole and rod holder 552 are typically designed to withstand centrifugal forces on a projecting rod 554 held by a rod holder 552). A proximal end of each rod holder 552 may be screwed into a tapped hole in core 551, or otherwise secured to core 551, after a projecting rod 554 is inserted into, and held by, a distal end of rod holder 552. Alternatively or in addition, a rod holding structure may be incorporated into core 551.

Figure 6:
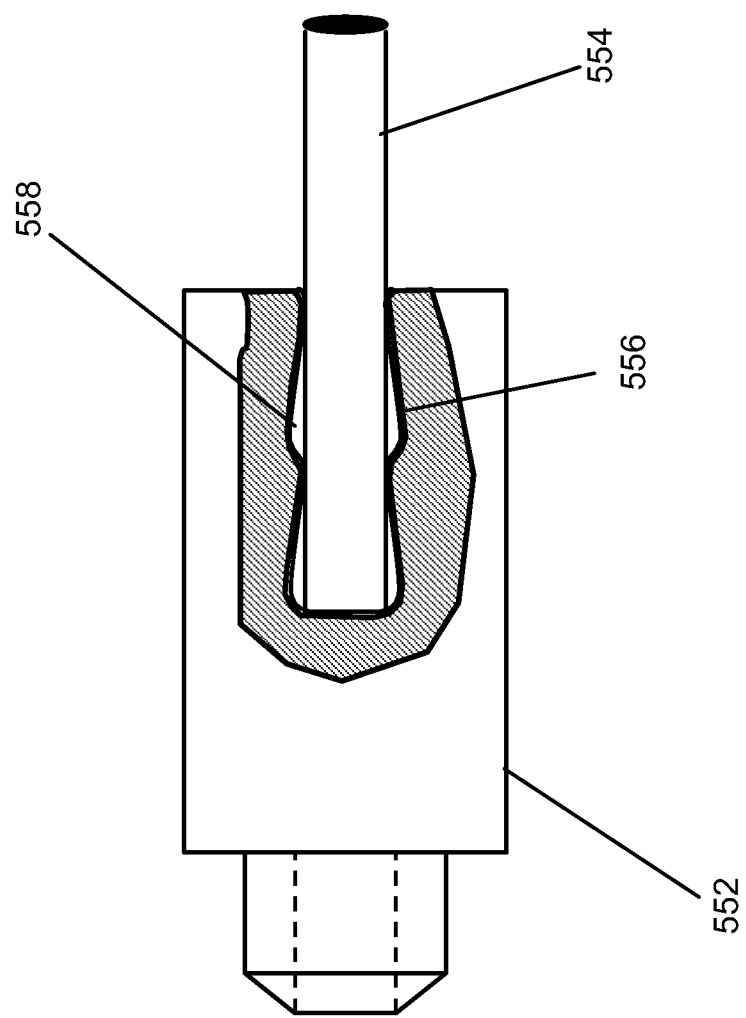
FIG. 6 schematically illustrates operation of a rod holder of the brush-like flywheel shown in FIG. 5A.

FIG. 6 schematically illustrates operation of a rod holder of the brush-like flywheel shown in FIG. 5A.

In accordance with some embodiments of the present invention, a projecting rod 554 may be attached to a rod holder 552 by press fit. In this case, a proximal end (or all of) projecting rod 554: is cooled (e.g., by liquid nitrogen or another coolant) so as to reduce its diameter. The cooled end is inserted into an accurately machined cavity of rod holder 552. When the end of projecting rod 554 warms, the proximal end of projecting rod 554 expands and fills the cavity. Projecting rod 554 is thereafter held in base by friction with the walls of the cavity.

Alternatively or in addition, a cavity 558 of rod holder 552 includes wedge-shaped spaces, as shown in FIG. 6. The spaces may be filled with glue, such as a high shear-stress glue, or a matrix material as a proximal end of projecting rod 554 is inserted into cavity 558. When the material hardens, the material and cavity 558 serve as a self-locking wedge mechanism that prevents the projecting rod 554 from being pulled out of cavity 558 by centrifugal forces.

Alternatively or in addition, a projecting rod 554 may be held to a cavity in a rod holder 552 or in core 551 by a collapsible ferule.

Figure 7:
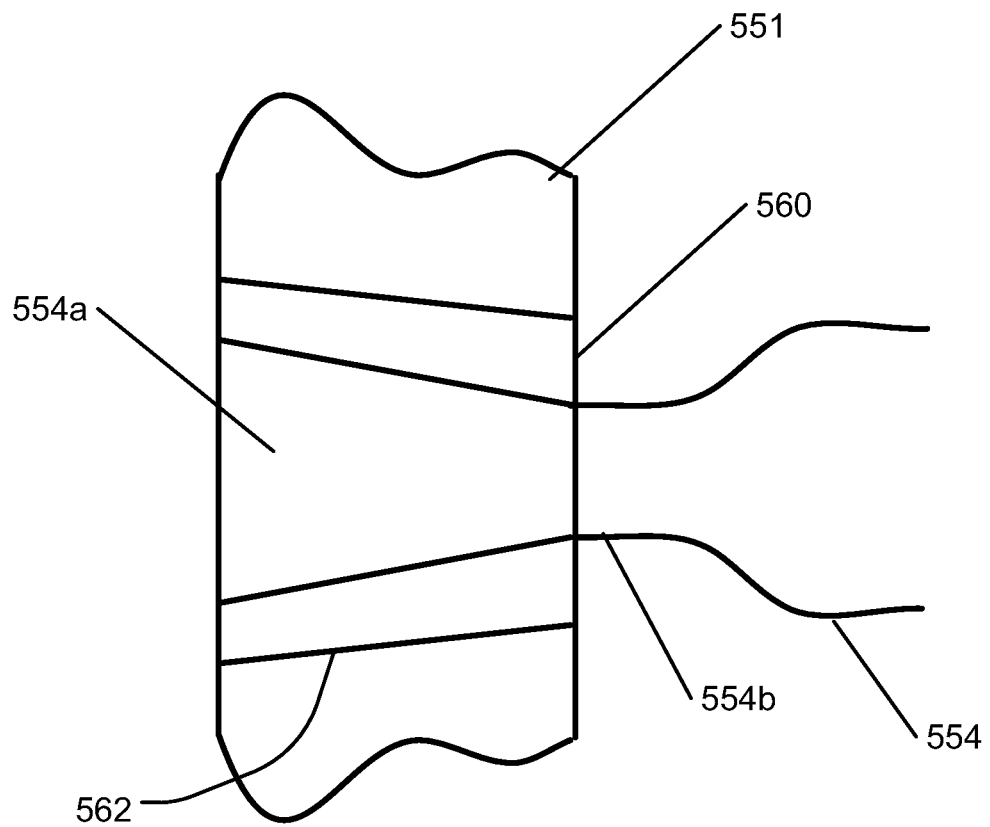
FIG. 7 schematically illustrates operation of a collapsible ferule to hold a projecting rod.

FIG. 7 schematically illustrates operation of a collapsible ferule to hold a projecting rod.

Collapsible ferule 560 includes a machined (or otherwise formed) metal part with a conical external shape. The internal shape of collapsible ferule 560 is shaped to a profile that is designed to create a desired load profile on projecting rod 554. Initially, when projecting rod 554 is inserted into ferule 560, the internal diameter of ferule 560 is greater than the diameter of projecting rod 554. Ferule 560, with projecting rod 554 inserted, is pushed into conical hole 562. The cone angle of conical hole 562 matches the cone angle of the external surface of ferule 560. When ferule 560 with inserted projecting rod 554 is pushed into conical hole 562, ferule 560 is pressed and collapses onto proximal end 554a of projecting rod 554. Continued pushing into conical hole 562 continues to press ferule 560 onto projecting rod 554 until a desired pressure is attained, forming constricted neck 554b on projecting rod 554. For example, if the outer diameter of a fiberglass projecting rod 554 is about 12 mm, then the diameter of constricted neck 554b may be reduced by about 0.1 mm.

Use of ferule 560 may apply circularly uniform pressure on the outer surface of projecting rod 554, thus avoiding mechanical failure of outer fibers of projecting rod 554 which could result in reduced pull strength. The ferule inner profile, relating the inner diameter of ferule 560 to its insertion distance, and the desired pressure may be calculated by taking into account the effects of Poisson's effect contraction on the rod diameter resulting from exertion of the high pull force. The desired pressure profile on projecting rod 554 may be calculated to minimize the combined (von Mises) stress on projecting rod 554. For example, at constricted neck 554b of projecting rod 554, pull forces may be very high. Thus, at constricted neck 554b, pressure forces should be sufficiently low to avoid high von Mises stress. The pressure profile should increase gradually in accordance with the decrease in the pull force due to the friction forces on the outer surface of projecting rod 554.

A brush-like flywheel construction may be advantageous. For example, such a construction is unlikely to catastrophically fail. If one of projecting rods 554 were to fail or disintegrate, the centrifugal forces would throw the resulting debris to be thrown outward toward the walls of a vacuum enclosure that encloses the rotor. Since brush-like flywheel 550 typically includes hundreds of projecting rods 554, the kinetic energy of a single failed rod is relatively low. Therefore, a requirement for reinforced housing or for some other safety features may be reduced or eliminated. In addition, safety factors that are used in determining operating parameters may be relaxed somewhat relative to other types of flywheels. A flywheel system incorporating brush-like flywheel 550 may be equipped with imbalance detectors that could sense any imbalance caused by a detached projecting rod 554. Upon detection of such a failure, braking may be applied to brush-like flywheel 550, or brush-like flywheel 550 may otherwise be brought to a gradual halt. Furthermore, since brush-like flywheel 550 is constructed primarily out of glass and metal, components may be recyclable and no use of any hazardous material is required.

In accordance with some embodiments of the present invention, a weight may be added to a distal end of each projecting rod of a brush-like flywheel. Addition of such weights increases the moment of inertia of the flywheel.

Figure 8:
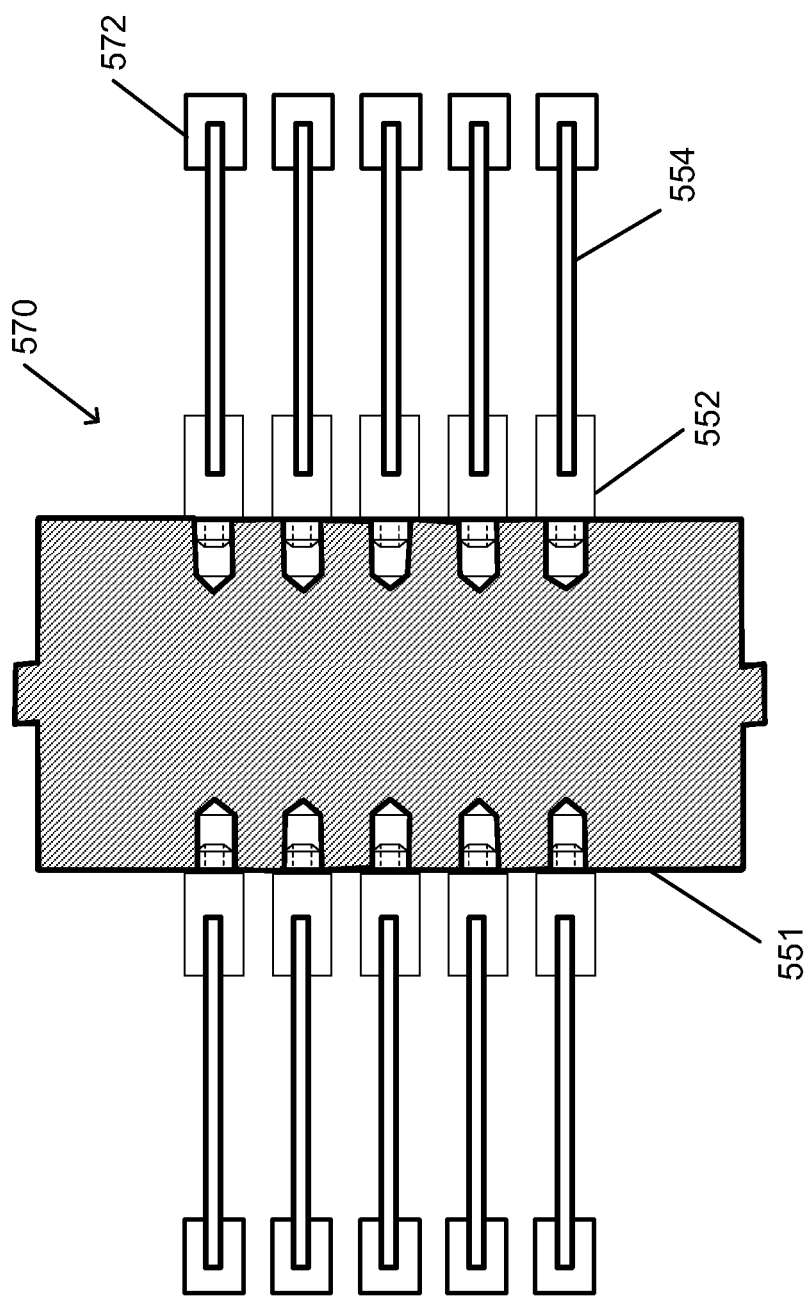
FIG. 8 schematically illustrates a variant of the brush-like flywheel shown in FIG. 5A, in which the radially projecting rods are weighted.

FIG. 8 schematically illustrates a variant of the brush-like flywheel shown in FIG. 5A, in which the radially projecting rods are weighted.

Weighted brush-like flywheel 570 includes projecting rods 554 with end weights 572 added to the distal ends of the rods. Each end weight 572 may be connected to a projecting rod 554 using one or more of the attachment techniques discussed above for attaching projecting rods 554 to core 551 or to rod holders 552, or using another attachment technique. End weights 572 may be constructed out of a dense material, e.g., steel or another material.

Attachment of end weights 572 to the distal ends of projecting rods 554 may be advantageous. For example, the increase in moment of inertia may increase the quantity of energy that may be stored for a given angular velocity without increasing the length of each projecting rod 554. Alternatively, attachment of end weights 572 may enable shortening each projecting rod 554, thus decreasing the lateral dimensions of weighted brush-like flywheel 570 relative to a brush-like flywheel without end weights. Alternatively, weighted brush-like flywheel 570 may be spun at a slower speed than a brush-like flywheel without end weights to store a similar quantity of energy.

In accordance with an embodiment of the present invention, a brush-like flywheel may include projecting glass fibers that act as projecting rods. The flywheel may be constructed out of stacked assemblies, each herein referred to as a cassette.

Figure 9:
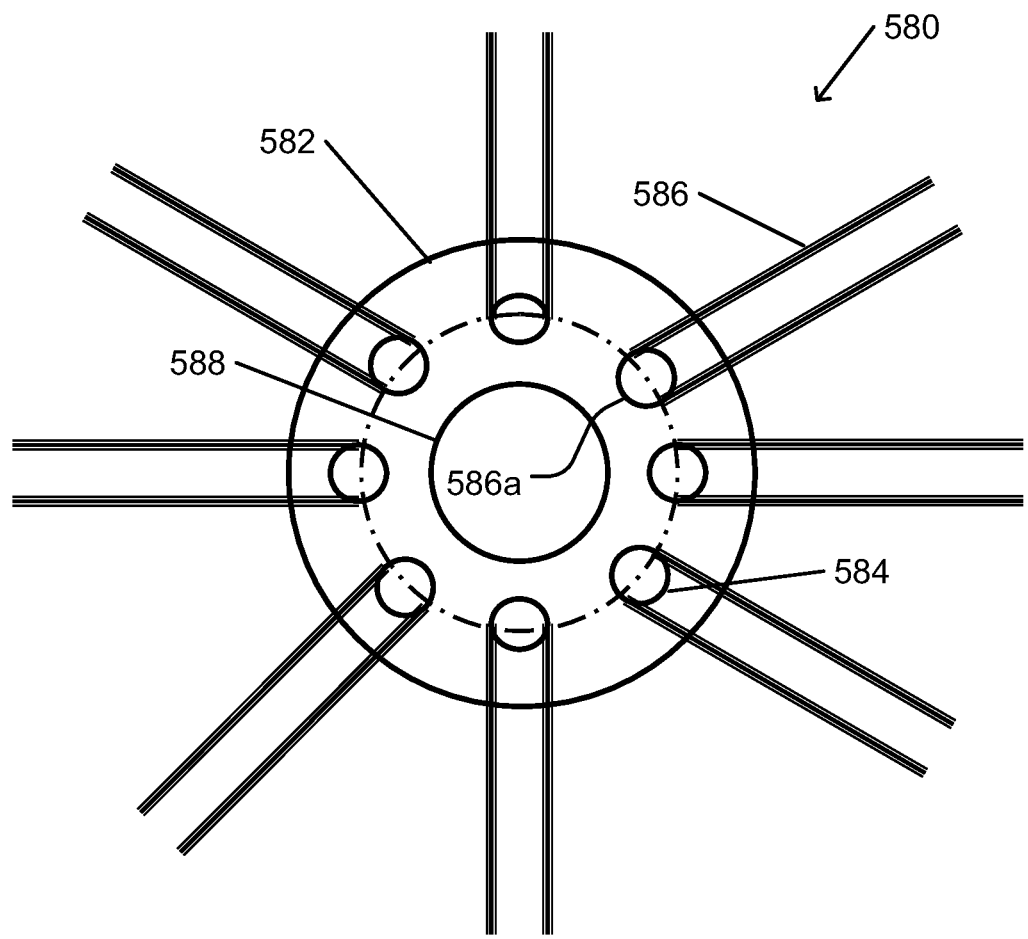
FIG. 9 schematically illustrates structure of a cassette of a glass fiber brush-like flywheel, in accordance with an embodiment of the present invention.

FIG. 9 schematically illustrates structure of a cassette of a glass fiber brush-like flywheel, in accordance with an embodiment of the present invention.

A plurality of flywheel cassettes 580 may be stacked to form a single brush-like flywheel with projecting rods in the form of projecting fibers. For example, the fibers may include glass. When stacked, the flywheel cassettes 580 are all centered about and mounted to a common central shaft 588.

Flywheel cassette 580 includes two plates 582 (only one plate is shown) sandwiching columns 584. For example, the plates 582 may be constructed out of a dense material, such as steel or another material.

Columns 584 extend from one plate 582 to the other. Columns 584 are arranged in a circular pattern that is concentric with plate 582 and with the axis of the flywheel. Columns 584 may be attached to plates 582 using screws, or using another suitable attachment mechanism or technique.

Glass fibers making up fiber bundles 586 are each partially (or fully) wrapped about each column 584. For example, fiber bundles 586 may each include a plurality of extremely thin fiber glass fibers, e.g., with a typical diameter of 7 microns to 20 microns. The fibers extend symmetrically and by an equally amount (e.g., by a typical distance of about 15 cm) from either side of column 584.

Fibers of a fiber bundle 586 may be glued together at contact region 586a where the fiber bundle 586 bends around a column 584.

When the flywheel rotates, centrifugal forces cause fibers of each fiber bundle 586 to extend radially outward from the axis of the flywheel. The centrifugal forces act approximately equally on both extending ends of fiber bundle 586. Thus, the effect of the centrifugal forces essentially tends to hold fiber bundles 586 in place. A fiber bundle 586 thus wrapped around a column 584 may be advantageous of an arrangement where glue or another holding method is depended upon to withstand or overcome the centrifugal forces. Use of techniques whereby projections, such as fibers or rods, pass through the core, although balancing the centrifugal forces, are limited as to the attainable density of the projections.

Since the tensile strength of very thin fiber glass fibers is typically very high (e.g., much higher that the tensile strength of ordinary glass rods), a flywheel including a plurality of cassettes 580 may be rotated at very high speeds without reaching the maximal tensile limit of the fibers.

Use of projecting fiber bundles 586 may be advantageous. For example, the likelihood of catastrophic failure of the flywheel is reduced. Since the flywheel may include millions of individual fibers, the kinetic energy of each fiber is relatively very low.

Figure 10:
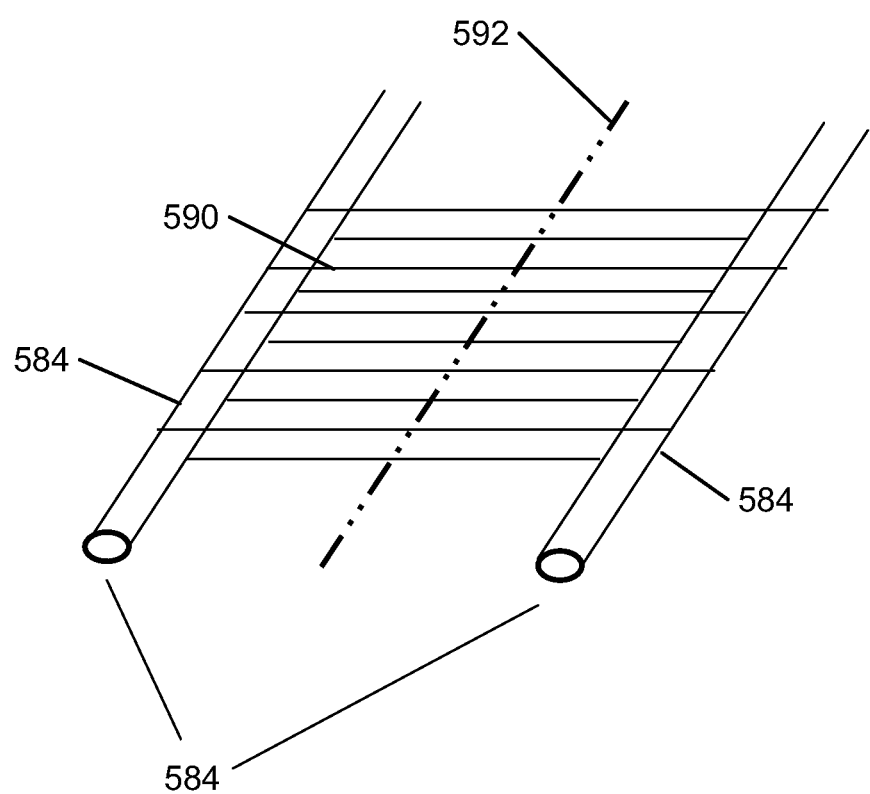
FIG. 10 illustrates a technique to form a fiber bundle for the cassette shown in FIG. 9.

FIG. 10 illustrates a technique to form a fiber bundle for the cassette shown in FIG. 9. A standard filament winding machine (not shown) may be applied to wind fibers 590 around two columns 584. Columns 584 may be held in place by a suitable fixture or holder (not shown). For example, the distance between the columns 584 may be typically equal to approximately 30 cm. Fibers 590 may be made of fiberglass, steel music wire, or any other high tensile-strength fiber. After fibers 590 are wound around the two columns 584, fibers 590 are glued to form bundles in the region where fibers 590 are wrapped around columns 584. After the glue cures, fibers 590 are cut, typically along midline 592 between columns 584. Thus, two U-shaped bundles are formed (about each of columns 584).

Alternatively or in addition, fibers 590 may be soaked in a matrix material prior to winding. After winding, fibers 590 may be cut and formed into bundles (e.g., each bundle having a typical diameter of about 12 cm). The bundles may then be cured (e.g., thermally or at room temperature, depending on the matrix material).

In accordance with embodiments of the present invention, a rotor of the motor/generator unit is mechanically coupled to a shaft of the flywheel unit within a vacuum enclosure. The stator of the motor/generator unit is located outside the vacuum enclosure. Such an arrangement is herein referred to as an open-frame motor/generator unit.

Figure 11:
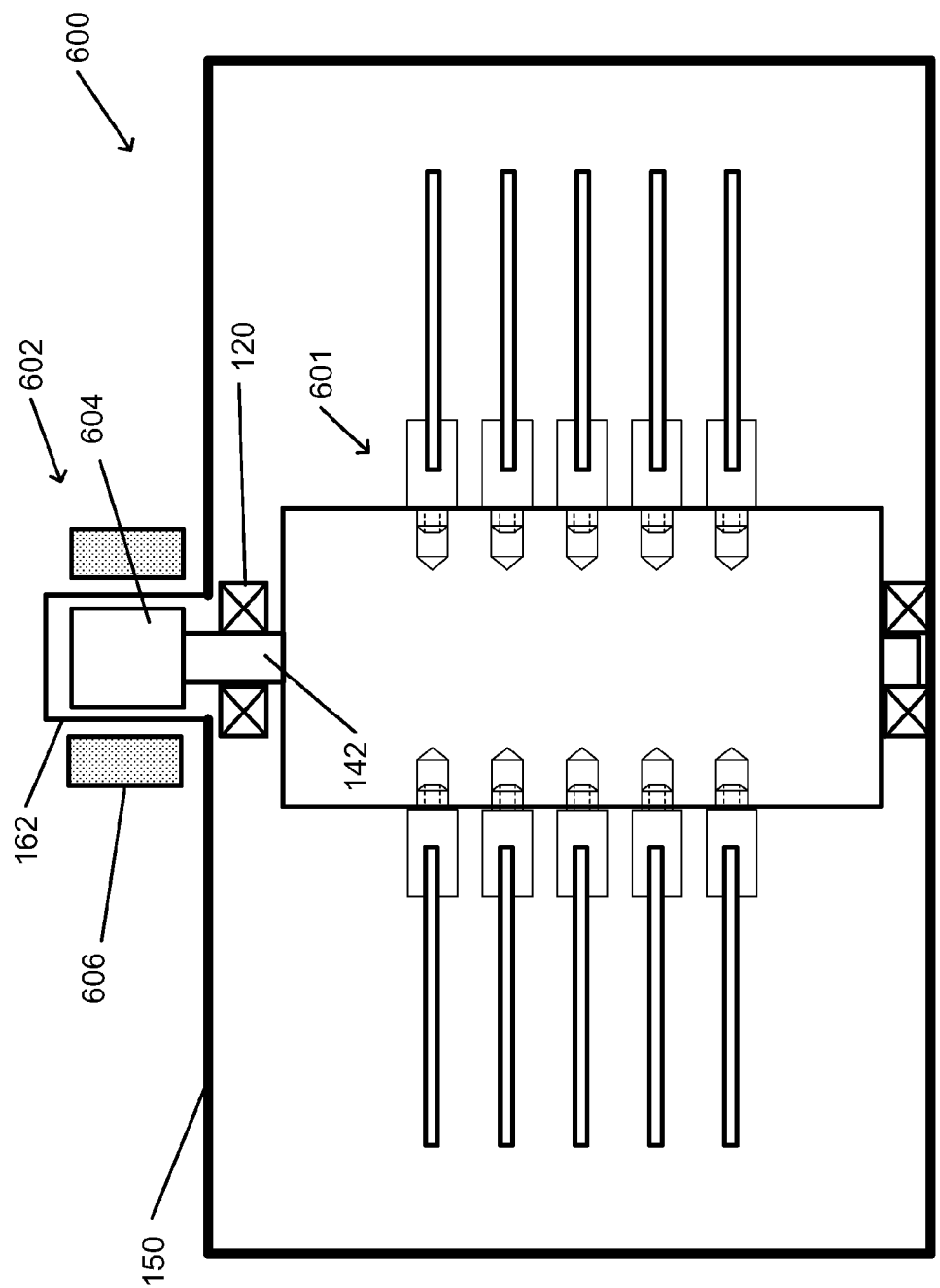
FIG. 11 schematically illustrates an open-frame motor/generator unit, in accordance with an embodiment of the present invention.

FIG. 11 schematically illustrates an open-frame motor/generator unit, in accordance with an embodiment of the present invention.

Open-frame flywheel energy storage system 600 includes flywheel 601 enclosed within vacuum enclosure 150. Flywheel 601 may include a brush-like flywheel as shown, or another configuration of a flywheel.

Rotor 604 of open-frame motor/generator unit 602 is mechanically attached, in a cantilevered manner (with no bearing or other support of rotor 604 other than shaft 142), to shaft 142 of flywheel 601. Rotor 604 is housed within cap 162 of vacuum enclosure 150. (Cap 162 may be in the form of a curved dome.) Stator 606 of open-frame motor/generator unit 602 is located outside of cap 160. Cap 162 is made of a magnetically susceptible material (e.g., a glass composite material such as Kevlar® or fiberglass, or another material) so as to enable magnet coupling between rotor 604 and stator 606. For example, rotor 604 and stator 606 may be separated by a typical distance of 3 mm, or another distance.

Stator 606 may be connected to an inverter of a high-voltage (HV) direct current (DC) bus, or other suitable circuitry.

Use of open-frame motor/generator unit 602 in a flywheel energy storage system may be advantageous. For example, enclosing rotor 604 within vacuum enclosure 150 may minimize atmospheric drag on rotor 604. Bearings 120 that support flywheel 601 also support rotor 604, thus avoiding the cost of additional bearings. Stator 606 may be removed from the remainder of open-frame flywheel energy storage system 600 when no charging or discharging is taking place. Such removal may reduce eddy current losses caused by rotor 604 rotating within the stator 606. Stator 606, being located outside of vacuum enclosure 150, may be cooled by natural convection or by forced convection (e.g., by a blower, fan, or pump). No electrical connections are required between components within vacuum enclosure 150 and circuitry outside of vacuum enclosure 150. A single stator unit may be shared with a plurality of flywheel units by an automatic movement system.

In accordance with some embodiments of the present invention, a plurality of individual flywheel units may be coupled to one another to form a flywheel cluster. Each flywheel cluster may be coupled to a single motor/generator unit. Each individual flywheel unit may be designed for a particular maximum rotation velocity. Coupling the flywheel units together may enable increasing the quantity of energy that is stored, without requiring modification of the design (e.g., flywheel or bearings) of the flywheel units. Furthermore, the energy may be stored or extracted without the cost of additional motor/generator units.

Figure 12:
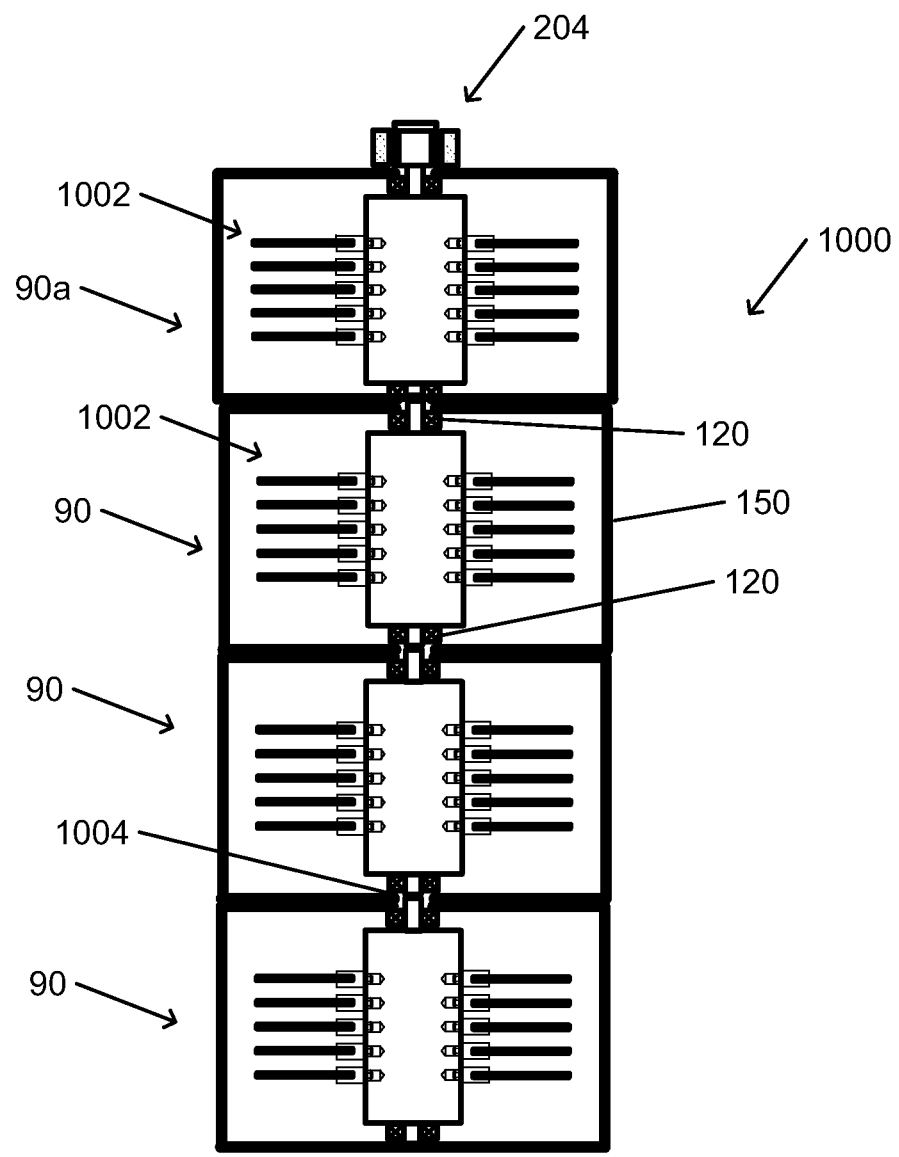
FIG. 12 schematically illustrates a flywheel cluster, in accordance with an embodiment of the present invention.

FIG. 12 schematically illustrates a flywheel cluster, in accordance with an embodiment of the present invention.

Flywheel cluster 1000 includes a stack of flywheel units 90. Each flywheel unit 90 includes a flywheel 1002 (which may be a brush-like flywheel, as shown, or another type of flywheel) that is individually supported and secured by a set of bearings 120 within its vacuum enclosure 150. Each flywheel unit 90 is permanently coupled to an adjacent flywheel unit 90 of flywheel cluster 1000 by magnetic coupling 1004. Thus, all flywheel units 90 of flywheel cluster 1000 rotate in tandem at a single rotational velocity.

A flywheel unit 90a at one end of flywheel cluster 1000 is coupled to motor/generator unit 204. For example, motor/generator unit 204 may include an open-frame motor/generator unit as shown. As another example, flywheel 1002 of flywheel unit 90a may be magnetically coupled to motor/generator unit 204. As another example, motor/generator unit 200 may be mechanically coupled to flywheel unit 90a and enclosed within vacuum enclosure 150 of flywheel unit 90a.

In accordance with embodiments of the present invention, a flywheel unit may include an active magnetic bearing. For example, use of active magnetic bearings may enable long-life and reliable support of the flywheel in the vacuum environment, where use of air bearings is precluded. Use of active magnetic bearings typically includes use of another set of conventional bearings ("landing bearings") during transportation and initial activation of the flywheel unit. The active magnetic bearings need to be powered at all times. Any interruption of supplied power would necessitate use of the landing bearings.

A typical active magnetic bearing system includes a shaft position sensor (e.g., based on eddy current or capacitive sensors) to monitor the position of the rotating shaft that is being stabilized. A rotor spins with the shaft (may be mounted to the shaft or may be identical with the shaft). Inductive actuators are used to attract the rotor or shaft being stabilized. Control and drive circuitry controls operation of the inductors in accordance with the sensed position of the shaft.

In accordance with embodiments of the present invention, a flywheel or other rotating load may be supported by mechanical bearings. A stabilization system may be provided to balance the rotating load. For example, the stabilization system may include an active magnetic balancing system.

Figure 13B:
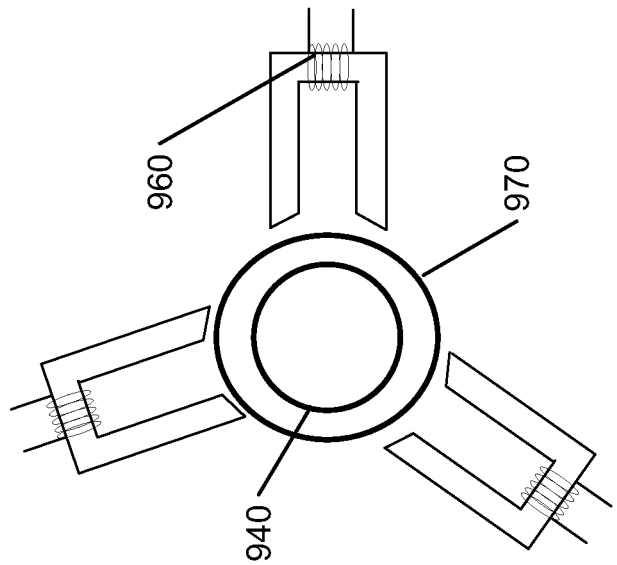
FIG. 13B shows a top view of the active magnetic balancing system shown in FIG. 13A.
Figure 13A:
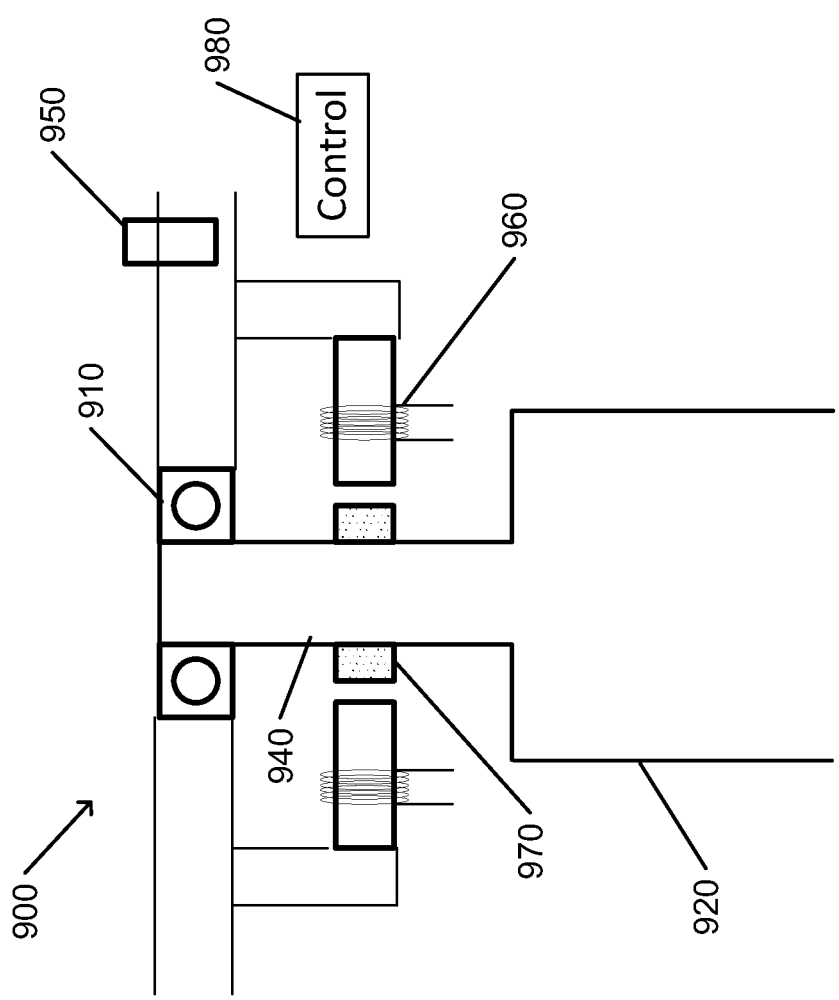
FIG. 13A schematically illustrates an active magnetic balancing system for a flywheel of a flywheel energy storage system, in accordance with an embodiment of the present invention.
Figure 13:
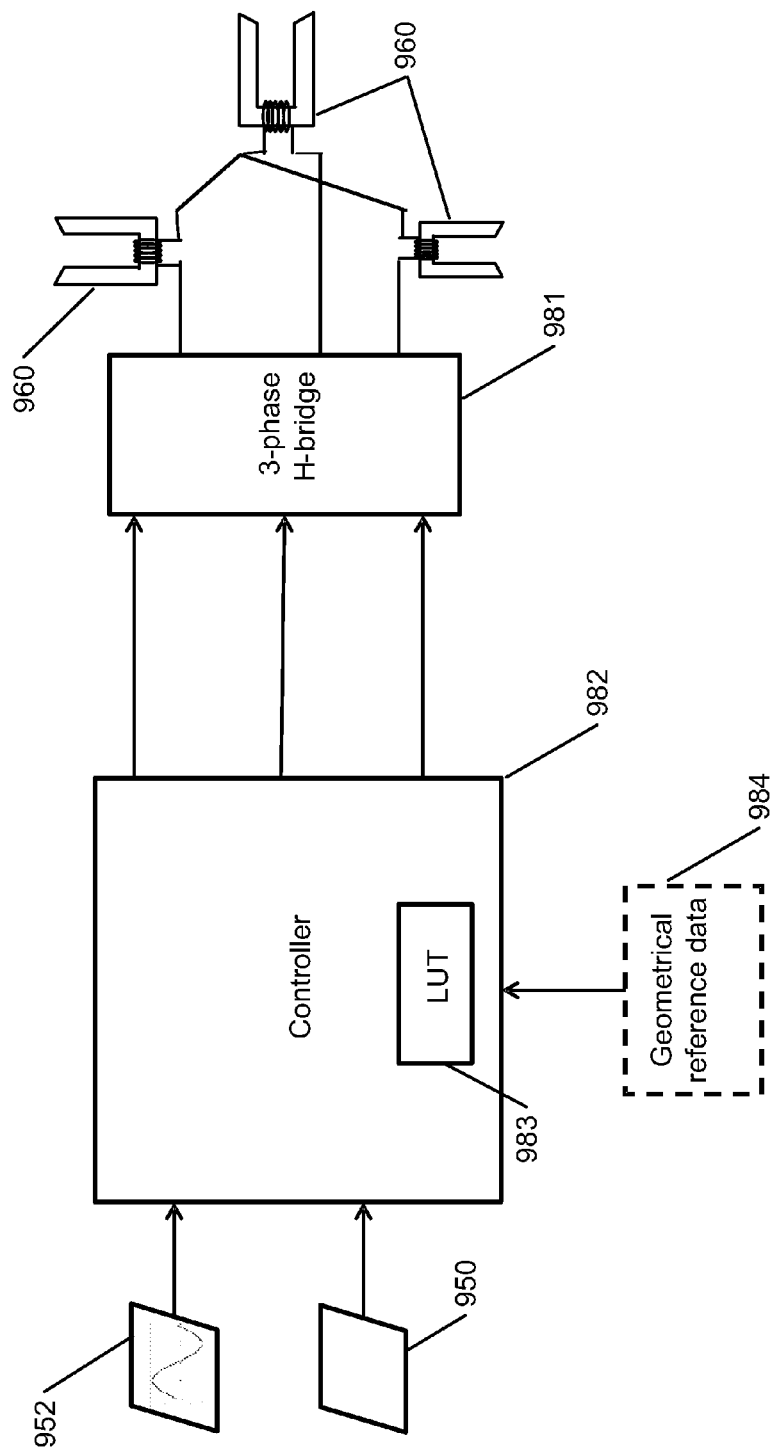
FIG. 13C schematically illustrates control of the active magnetic balancing system shown in FIG. 13A using a three-phase H-bridge.
FIG. 13D schematically illustrates control of the active magnetic balancing system shown in FIG. 13A using power amplifiers.

FIG. 13A schematically illustrates an active magnetic balancing system for a flywheel of a flywheel energy storage system, in accordance with an embodiment of the present invention. FIG. 13B shows a top view of the active magnetic balancing system shown in FIG. 13A.

Flywheel active magnetic balancing system 900 is configured to stabilize shaft 940 of flywheel 920. Although flywheel active magnetic balancing system 900 is described herein as applied to a flywheel system for energy storage, flywheel active magnetic balancing system 900 may be applied to stabilize any rotating load whose shaft is supported by mechanical bearings.

Shaft 940 is continuously held in place by ball bearing assembly 910. For example, ball bearing assembly 910 may include a metal ball bearing, a ceramic ball bearing, a hybrid ball bearing assembly, or another mechanical bearing. Flywheel 920 may be balanced to a high degree (e.g., as required by ISO 1940 class G1). However, radial forces on ball bearing assembly 910 may limit the bearing's lifetime and may create severe vibrations during operation. The radial forces may contribute to internal friction and may cause overheating of ball bearing assembly 910, reducing operational efficiency of a flywheel unit that includes flywheel 920.

Flywheel active magnetic balancing system 900 includes one or more sensors 950. Sensors 950 may include vibration or force sensors. Sensors 950 are mounted on the stationary side of ball bearing assembly 910, or in close proximity to it. Each sensor 950 may give a fast and accurate reading of imbalance forces operating on the ball bearing assembly 910 in a particular direction. Sensors 950 may be located sufficiently far from inductive actuators 960 to prevent inductive actuators 960 from influencing readings by sensors 950.

A magnetic stabilization assembly that includes a plurality of (e.g., three) electromagnets is controllable to create a resultant magnetic field that reduces imbalance forces acting on shaft 940. Each electromagnet is included in an inductive actuator 960. Inductive actuators 960 are mounted on a stationary (non-rotating) structure. Inductive actuators 960 may be operated to attract rotor ring 970. Rotor ring 970 is mounted on shaft 940, or may be incorporated into or may be identical with shaft 940. For example, rotor ring 940 may be made from stacked layers of electrical steel (e.g., such as is used in transformer cores). The use of thin silicone steel (e.g., of 0.2 mm thickness) can contribute to reduced eddy current losses.

Control unit 980 may include a processor or other control circuitry. For example, control unit 980 may include an application-specific integrated circuit (ASIC). Control unit 980 may be configured to receive a signal that is indicative of vibration or force from sensors 950. An algorithm may be applied to the signals to calculate how inductive actuators 960 are to be driven in order to minimize or reduce the sensed forces that act on ball bearing assembly 910.

Use of flywheel active magnetic balancing system 900 may be advantageous. For example, stress and losses by ball bearing assembly 910 may be reduced significantly, thus increasing reliability, service life, and time between maintenance for ball bearing assembly 910. Operation of flywheel 920 is not solely dependent on operation of the magnetic bearings, since temporary failure of the magnetic bearings would enable continued operation while only temporarily increase the load on ball bearing assembly 910. Geometrical stability of the shaft (which may be a major concern with conventional magnetic bearings) is ensured by ball bearing assembly 910. Changes in flywheel balance, either dynamically (as the rotation speed changes) or over time (due to creep), may be compensated continuously. Control unit 980 may be configured to provide information about any sensed imbalance or creation of vibrations. Such provided information may be utilized to avoid catastrophic failure events.

Control of flywheel active magnetic balancing system 900 may differ from control of a magnetic bearing system. In a typical magnetic bearing system, shaft position is measured and corrected. However, in flywheel active magnetic balancing system 900, shaft 940 is fixed in space by ball bearing assembly 910 and the magnetic field generated by inductive actuators 960 exerts a force on rotor ring 970 (and on shaft 940). Ball bearing assembly 910 provides sufficient stiffness such that exerted forces do not cause significant movement or deflection of shaft 940. Thus, sensors 950, which include vibration or acceleration sensors, are used in flywheel active magnetic balancing system 900. Sensor 950 measures vibration caused by imbalance of shaft 940. This vibration may be described by a sinusoidal functional shape, where the phase of the sinusoidal function is determined by the position of sensor 950 relative to a vector that describes the rotational imbalance. When flywheel active magnetic balancing system 900 is not functional, imbalance forces are countered by ball bearing assembly 910. When flywheel active magnetic balancing system 900 is functional, the magnetic field exerts forces to counter the imbalance (and the radial forces on ball bearing assembly 910 are minimized). It may be noted that the vibrations that are measured by sensor 950 are in principal the same whether the radial load is handled by ball bearing assembly 910 or by flywheel active magnetic balancing system 900.

Control of flywheel active magnetic balancing system 900 may include controlling inductive actuators 960 to create a rotating force vector with the same rotation speed as that of shaft 940 (synchronous force vector). For example, the driving frequency of the coil excitation (in case of three inductive actuators 960 placed at 120 degree intervals) may be half of the rotational speed of shaft 940. (For example, the force exerted by each of inductive actuators 960 may be proportional to the square of the current in that inductive actuator 960. Thus, when the current is described by a sine wave, the frequency of the exerted force is double that of the current.) The phase angle is varied over 360 degrees while the vibrations are measured by sensor 950. A maximum sensed vibration is indicative that the magnetic force vector is in phase with the mechanical imbalance vector. The phase of the rotating magnetic force vector is then changed by 180 degrees (opposite the mechanical imbalance) while its amplitude is varied from zero to a preset maximal value. When the amplitude is zero, all the imbalance is handled by ball bearing assembly 910 alone. As the amplitude of the magnetic force vector is increased, the force on ball bearing assembly 910 is reduced. When the force on ball bearing assembly 910 reverses direction, the optimal amplitude is indicated. This procedure may be repeated from time to time to enable compensation for changes in flywheel balance.

Alternatively or in addition, the phase to be applied may be calculated using measurements from two sensors 950 sensing vibrations mounted with a 90 degree separation about the flywheel axis. A balancing calculation algorithm that is executed by controller 980 may be configured to determine desired phase angle for the balancing signal.

FIG. 13C schematically illustrates control of the active magnetic balancing system shown in FIG. 13A using a three-phase H-bridge.

Inductive actuators 960 are driven by a three-phase H-bridge 981 (similar H-bridges used in motor controllers). Three-phase H-bridge 981 is driven by controller 982. Controller 982 is configured to provide standard three-phase control of inductive actuators 960. Controller 982 is additionally configured to modify the phase of the three sine wave signals that drive inductive actuators 960 so as to modify the phase of the rotating resultant force vector. Thus, the phase may be controlled to minimize vibrations or flywheel rotor imbalance as detected by sensor 950.

Controller 982 is furthermore configured to compensate for geometric variation of mechanical components due to various tolerances in the production and assembly of the inductive actuators 960 and rotor ring 970. Such manufacturing tolerances (e.g., with typical magnitudes of about 0.1 mm) could cause variations in the resultant force (which is dependent on the reciprocal of the square of the distance between inductive actuator 960 and rotor ring 970). Thus, even when high-end machining and wire cutting techniques are used, tolerances of ±0.1 mm to ±0.01 mm could be present. Since the distance between rotor ring 970 and magnetic actuators 960 may be about 0.3 mm, such tolerances could lead to considerable variance in the force and could require compensation, even if the actuators themselves and the driving current were to be perfectly accurate.

Lookup table (LUT) 983 may include corrections to the drive signals that are based on geometrical reference data 984. Geometrical reference data 984 may be measured during production may be and can be utilized by controller 982, together with LUT 983 and with rotation data provided by encoder 952, to facilitate calculation of the correction. Thus, rotating force vector may be correctly generated constantly to compensate for variation in dimensions due to manufacturing and assembly tolerances.

Figure 13D:
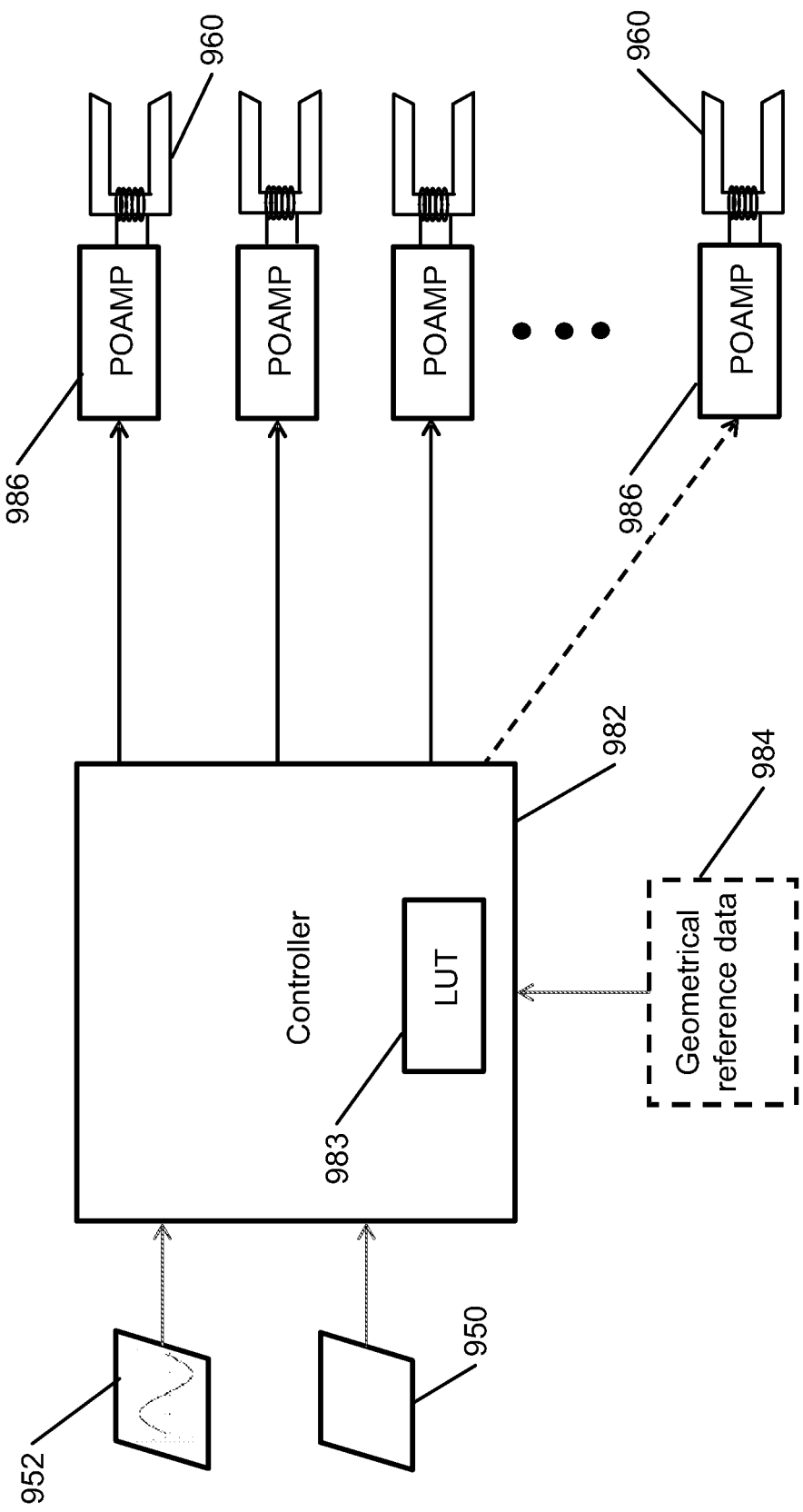

FIG. 13D schematically illustrates control of the active magnetic balancing system shown in FIG. 13A using power amplifiers.

Inductive actuators 960 are fed by power amplifiers (POAMP) 986. Each power amplifier 986 may be individually controlled. Thus, each phase may be individually controlled. LUT 983 may be utilized in controlling power amplifiers 986 so as to compensate for geometrical tolerances provided by the geometrical reference data 984. More than three inductive actuators may be individually controlled, enabling additional flexibility in correcting individual drive signals and increasing the accuracy of the rotating force vector.

In accordance with an embodiment of the present invention, a flywheel rotor may include an automatic balancing system. Wireless control may be utilized to change a configuration of an eccentric structure on the flywheel shaft in order to adjust the balancing of the flywheel (without use of slip ring or other contact-based communication between a controller and balancing mechanism).

Figure 14B:
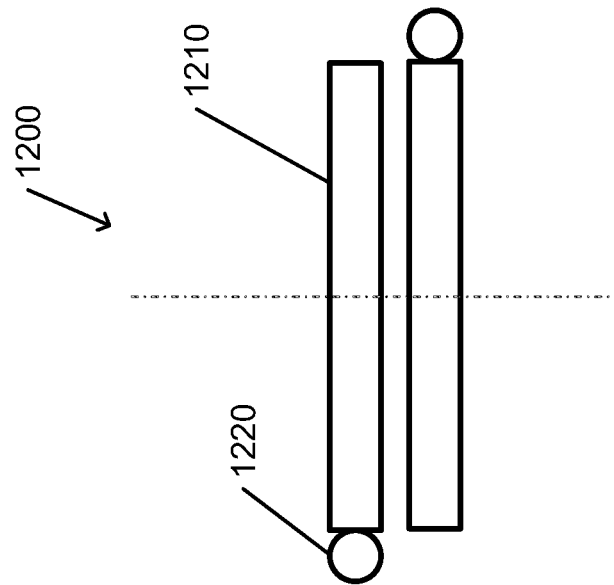
FIG. 14B is a side view of the flywheel balancing assembly shown in FIG. 14A.
Figure 14A:
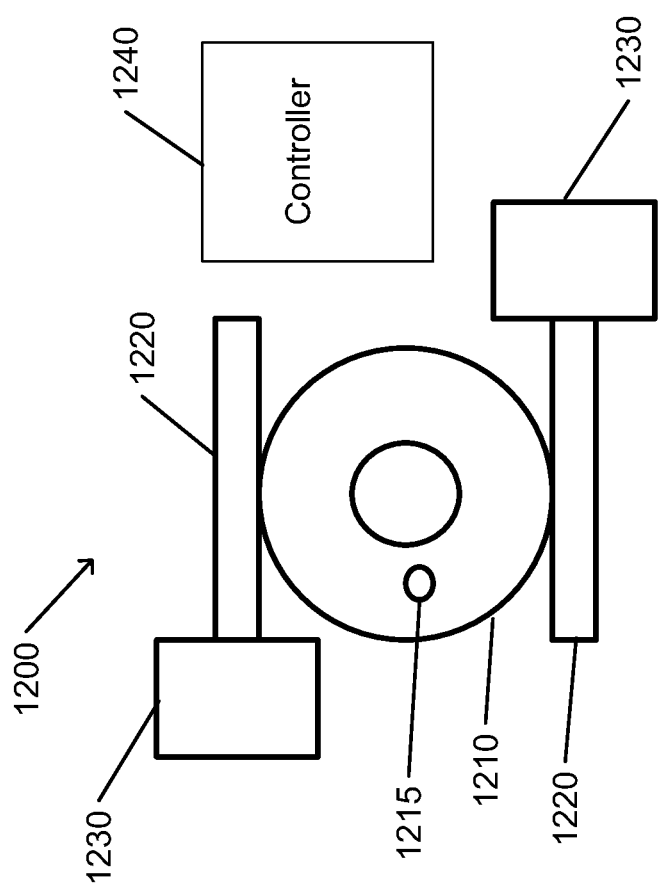
FIG. 14A is a schematic illustration of a flywheel balancing assembly for a flywheel energy storage system, in accordance with an embodiment of the present invention.

FIG. 14A is a schematic illustration of a flywheel balancing assembly for a flywheel energy storage system, in accordance with an embodiment of the present invention. FIG. 14B is a side view of the flywheel balancing assembly shown in FIG. 14A.

Flywheel balancing assembly 1200 may be mounted on a flywheel rotor. Flywheel balancing assembly 1200 may be controlled by controller 1240. Controller 1240 may be stationary (not rotating). Controller 1240 may control operation of flywheel balancing assembly 1200 in accordance with sensed signals from imbalance sensors.

Flywheel balancing assembly 1200 includes two worm gears 1210. Each worm gear 1210 includes eccentric borehole 1215 that is aligned parallel to the axis of worm gear 1210. Eccentric borehole 1215 causes worm gear 1210 to have an eccentric mass distribution that may be adjusted to balance the flywheel by rotation about that longitudinal axis of worm gear 1210.

Each worm gear 1210 may be rotated by rotation of a worm screw 1220 by operation of motor assembly 1230. Worm screw 1220 and motor assembly 1230 also rotate together with the flywheel rotor. (Placement of two worm screws 220 and two motor assemblies 1230 in a symmetric manner about the flywheel rotor may avoid introducing imbalance in the flywheel.) Each motor assembly 1230 may be controlled by a signal generated by controller 1240 to rotate clockwise or counterclockwise by a controlled rotation angle. When no command signal is generated by controller 1240, worm gears 1210 self-lock and there is no movement of worm gears 1210.

A control signal may be transmitted wirelessly from a stationary controller 1240 to a motor assembly 1230 that rotates together with the flywheel. For example, an optical signal may be generated by controller 1240, e.g., by a light emitting diode (LED), diode laser, or other device. The optical signal may be detected by a photo-sensor (e.g., photovoltaic cell) that is mounted on the rotating components of flywheel balancing assembly 1200. Transmitted commands may be distinguished from one another by transmitter location (e.g., angular or radial encoding), by wavelength of the optical signal, or by another characteristic of the optical signal.

An electromagnetic signal may be generated by controller 1240. A motor assembly 1230 may be provided with a inductor to enable inductive powering of motor assembly 1230.

In accordance with embodiments of the present invention, a flywheel energy storage system may include a plurality of flywheel units arranged in one or more arrays (e.g., as shown in FIG. 2). The flywheel energy storage system may be controlled to determine a rate at which a motor/generator unit is storing energy in a flywheel unit or is extracting energy from the flywheel unit. The controlling may be such that a rate of energy storage or extraction is kept a substantially constant level, even when a motor/generator unit is disconnected from all flywheel assemblies (e.g., is being moved from one flywheel assembly to another). The controlling may be coordinated with a smart grid that is configured to determine a level of power that is to be provided by, or to be stored in, the flywheel energy storage system.

Figure 15:
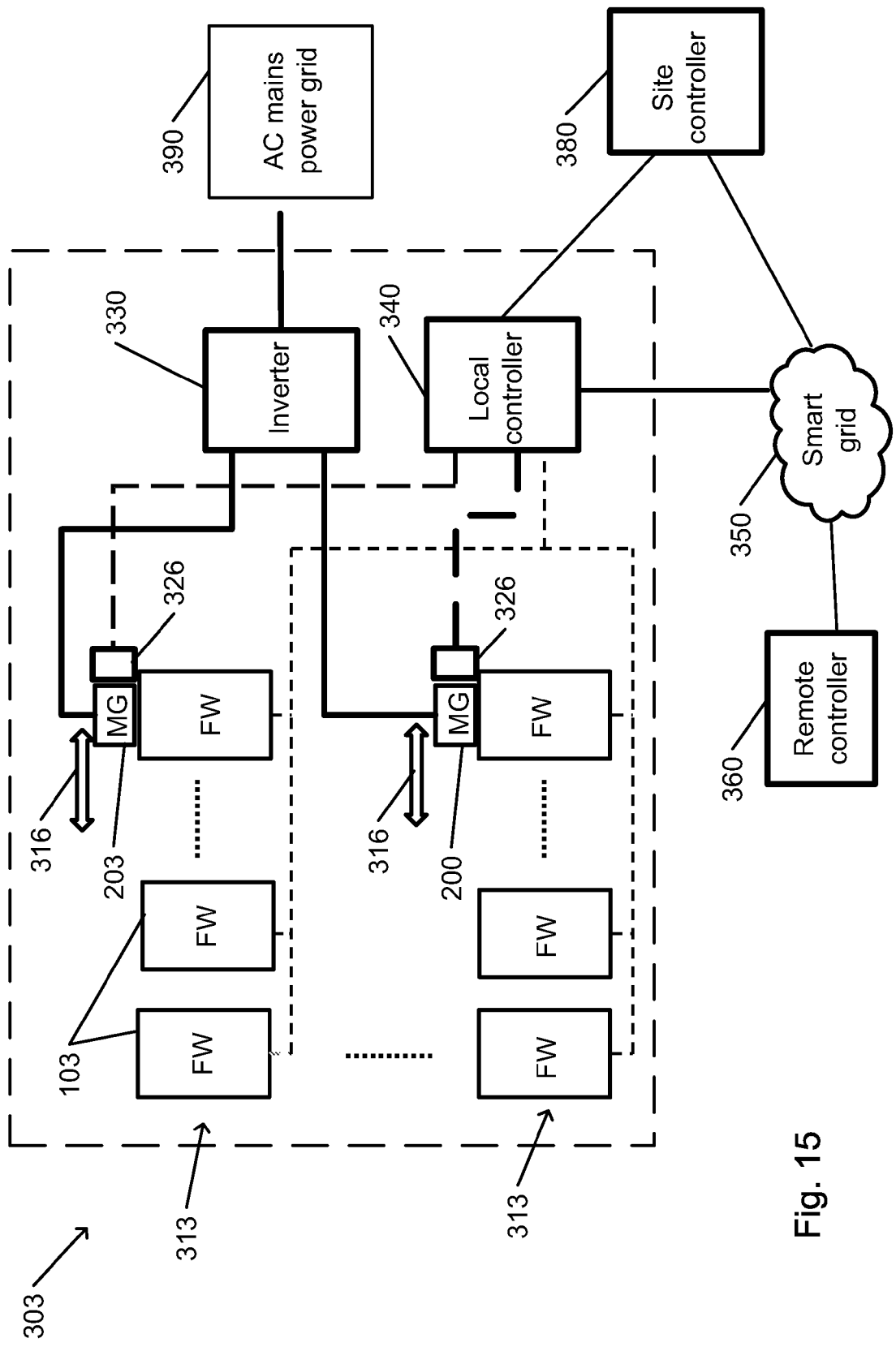
FIG. 15 schematically illustrates a flywheel energy storage system that includes an array of flywheel units, in accordance with an embodiment of the present invention.

FIG. 15 schematically illustrates a flywheel energy storage system that includes an array of flywheel units, in accordance with an embodiment of the present invention.

Flywheel array energy storage system 303 includes a plurality of flywheel units 103 arranged in a plurality of flywheel groups 313 (e.g., four flywheel groups 313). Each flywheel group 313 is provided with a motor/generator unit 200 and an associated power controller 326. The motor/generator unit 200 and power controller 326 of a flywheel group 310 is configured to couple with any flywheel unit 103 of that flywheel group 310. Power controller 326 is configured to control its associated motor/generator unit 200 store or provide electrical power at a determined rate. For example, an electrical power storage or supply rate may range from 0.5 kW to 15 kW (or another range). Motor/generator units 200 are connected to central inverter 330. Central inverter 330 is connected to alternating current (AC) mains power grid 390. During typical operation, each motor/generator unit 200 may operate at a typical power level. For example, at a typical power level of about 10 kW per motor/generator unit 200, a flywheel array energy storage system 303 with four flywheel groups 313 may operate at a total power level of about 40 kW.

The power level of each motor/generator unit 200 and of central inverter 320 is controlled by local controller 340. Local controller 340 is configured to operation of the entire flywheel array energy storage system 303.

Local controller 340 may be in communication with one or more remote controllers 360. Communication with remote controller 360 may take place via smart grid network 350, or via another network or communications channel.

Alternatively or in addition, local controller 340 may be in communication with site controller 370. Site controller 370 may be configured to manage energy flow at a renewable energy generation site or another energy generation and storage facility. (Site controller 370 may manage multiple local controllers 340. At a small site, local controller 340 may function as a site controller.)

Movement control system 316 may be operated to move a motor/generator unit 200 from one flywheel unit 103 to another. During the movement, the power to or from the flywheel group 313 with which that motor/generator unit 200 is associated may be interrupted. Local controller 340 may be configured to reduce or minimize effects of the interruption.

Local controller 340 may be configured to operate so as to reduce or eliminate effects of the interruption in one flywheel group 313. For example, prior to and during movement, the power level of other flywheel groups 313 of flywheel array energy storage system 303 may be gradually increased while the power level of that flywheel group 313 is gradually decreased to zero.

For example, in a flywheel array energy storage system 303 with four flywheel groups 313 may have a nominal power level of 10 kW per flywheel group 313. Prior to movement, power of the flywheel group 313 in which the movement is to take place may be reduced to 5 kW. Concurrently, the power levels of two other flywheel groups 313 are increased to a compensating power level of 12.5 kW. Next, the power level of the flywheel group 313 in which movement takes place is reduced to zero, while the power of the other three flywheel groups 313 is increased to 13 kW, 14 kW and 14 kW, respectively. The modified power levels are maintained until the motor/generator unit 200 of that flywheel group 313 is coupled to another (or the same) flywheel unit 103. At this point, the power level may be gradually changed until the power levels of all flywheel groups 313 are restored to their original nominal levels (e.g., 10 kW).

Local controller 340 may be configured to ensure that only one motor/generator unit 200 of only one flywheel group 313 of flywheel array energy storage system 303 is being moved (or being prepared to be moved) a any given time. For example, local controller 340 may be configured (e.g., by programmed instructions) to enable limited flexibility with regard to the overall energy storage limits of flywheel array energy storage system 303. For example, a flexibility margin (e.g., of about 1 kWh) would enable one motor/generator unit 200 to remain connected to a particular flywheel unit 103 until another movement (and coupling) of another motor/generator unit 200 is complete. Any variation in power level of flywheel array energy storage system 303 may be communicated (e.g., via smart grid network 350 or otherwise) to remote controller 360 or to site controller 370.

Local controller 340 may be configured to change power levels of flywheel groups 313 so as to enable disengaging a motor/generator unit 200 from a flywheel unit 103 so as to reduce the operating hours of that motor/generator unit 200.

Typically, a flywheel array energy storage system is configured to operate at high DC voltage (e.g., as high as 1000 V, or more typically at about 400 V). For example, a typical solar cell array may include a DC bus that is created by aggregating the output of several few solar panels in order to create a high-voltage and high-current bus. The bus is connected to an inverter that converts the output to synchronized alternating current (AC) voltage that is fed to an AC mains power grid. In some cases, an active power management unit may be used in order to optimize power transfer from each solar array to the central bus.

Typically, and as described above, a flywheel energy storage system may interface to the AC mains power grid. The flywheel energy storage system may store energy from the grid, or supply stored energy to the grid. The multiple energy conversions involved may affect the efficiency of the process.

In accordance with an embodiment of the present invention, a flywheel energy storage system may be directly connected to a renewable energy direct current (DC) bus. In this manner, the number of power conversions may be reduced.

Figure 16:
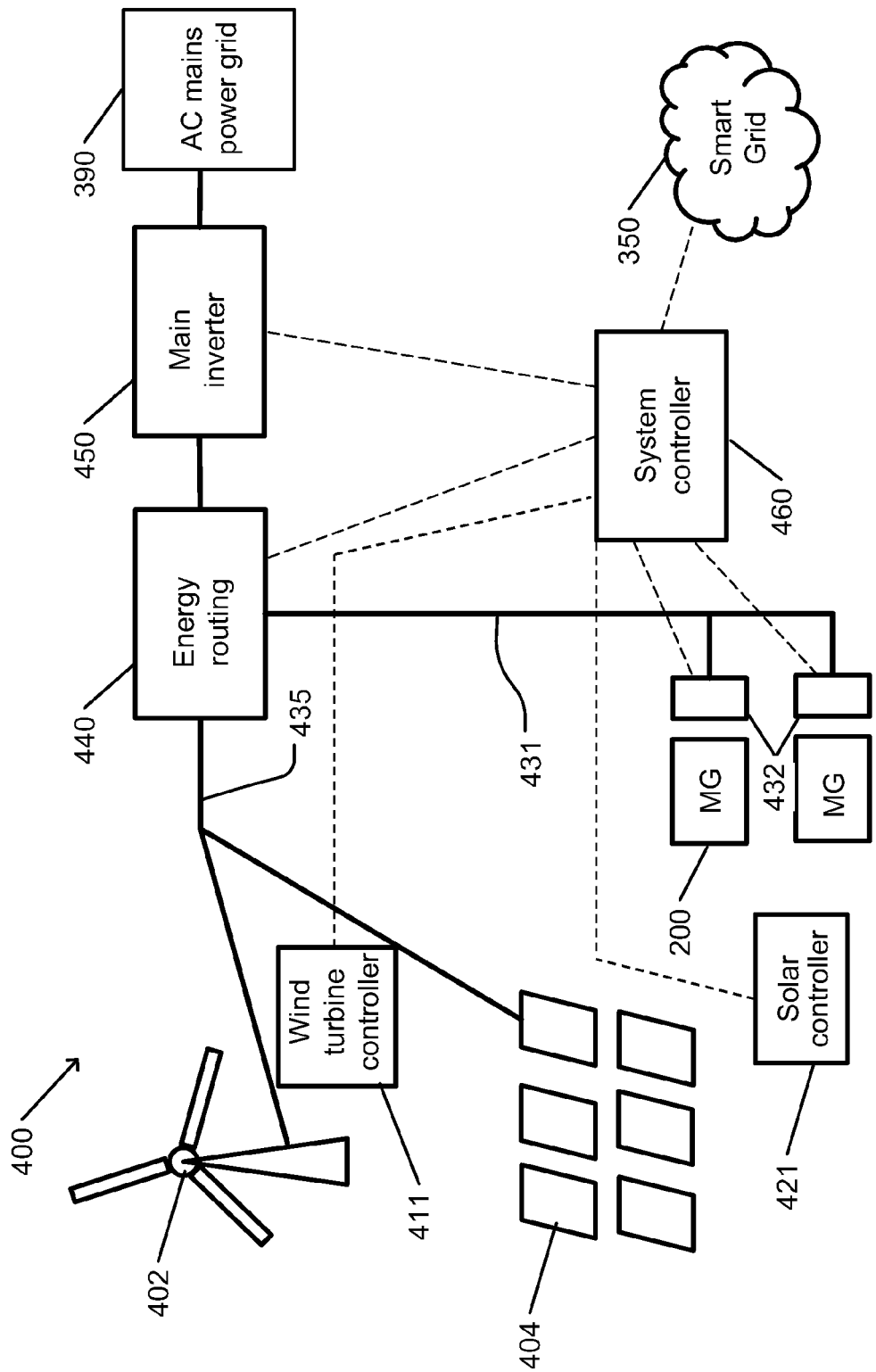
FIG. 16 schematically illustrates a flywheel energy storage system that is directly connected to a renewable energy DC bus, in accordance with an embodiment of the present invention.

FIG. 16 schematically illustrates a flywheel energy storage system that is directly connected to a renewable energy DC bus, in accordance with an embodiment of the present invention.

Renewable energy flywheel energy storage system 400 is designed to store energy from renewable energy generating devices. Renewable energy generating devices, such as wind turbine 402 or solar cell array 404, are connected to high voltage DC bus 435. High voltage DC bus 435 may operate at a variety of possible DC voltages. For example, the DC voltage of high voltage DC bus 435 may range from 400V to 1000 V. The DC voltage may be fed into main inverter 450. Main inverter 450 is configured to convert DC voltage to an AC one- or three-phase voltage that is synchronized to phase and frequency of AC mains power grid 390.

In some cases, wind turbine controller 411 and solar cell controller 421 may be in communication with system controller 460. Wind turbine controller 411 and solar cell controller 421 may be configured to monitor operation wind turbine 402 and solar cell array 404, respectively. For example, wind turbine controller 411 and solar cell controller 421 may report to system controller 460 the current supply level at which energy is supplied by wind turbine 402 or solar cell array 404. Wind turbine controller 411 and solar cell controller 421 may report any detected malfunction of wind turbine 402 or solar cell array 404 that could reduce power that is supplied or that is forecasted to be supplied.

According to an embodiment of the present invention, high voltage DC bus 435 is connected to energy routing unit 440. Energy routing unit 440 is configured to function as a managed energy router. Energy routing unit 440 may direct power from renewable sources to flywheel storage DC bus 431. The directed power is fed into inverter units 432 which drive the DC motors of motor/generator units 200. Alternatively, energy routing unit 440 may direct energy supplied by inverter units 432 via flywheel storage DC bus 431 to be fed to main inverter 450. Alternatively, energy routing unit 440 may direct power from high voltage DC bus 435 to main inverter 450.

System controller 460 may be configured to control energy routing unit 440 in accordance with a programmed decision system. Alternatively or in addition, system controller 460 may be configured to issue commands based on information received from other entities or remote controllers, e.g., via the smart grid network 350 or via other viable means of communications.

When the voltage of flywheel storage DC bus 431 is essentially the same as that of high voltage DC bus 435, then flywheel storage DC bus 431 may be connected directly to high voltage DC bus 435 without energy routing unit 440. Flow of energy to and from a flywheel unit may be managed by inverter 432 and flow of energy into main inverter 450 may be managed by an inverter controller. In this manner, the simplification of the system may avoid the cost and losses due to additional components, and system reliability and resilience may be improved.

Use of renewable energy flywheel energy storage system 400 may be advantageous. Overall efficiency may be improved by avoiding multiple power conversions (since DC current is converted to AC current only when being fed into AC mains power grid 390). Energy routing unit 440 may increase flexibility of the system by enabling increasing power to main inverter 450 when there is a temporary decrease in the power supplied by wind turbine 402 or by solar cell array 404. Energy routing unit 440 may route excess energy to be stored by the flywheel storage system. For example, regulations may limit the electrical power that is fed into AC mains power grid 390. Thus, surplus energy is utilizable at a later time. Connection of all units to a single high voltage DC bus 435 and a central system controller 460 may enable individual control of each flywheel unit.

In accordance with an embodiment of the present invention, a flywheel energy storage system may include a constant voltage DC bus. A constant voltage DC bus may avoid use of a master-slave configuration, where a failure or fault in the master unit could result in failure of the entire system to operate.

Figure 17:
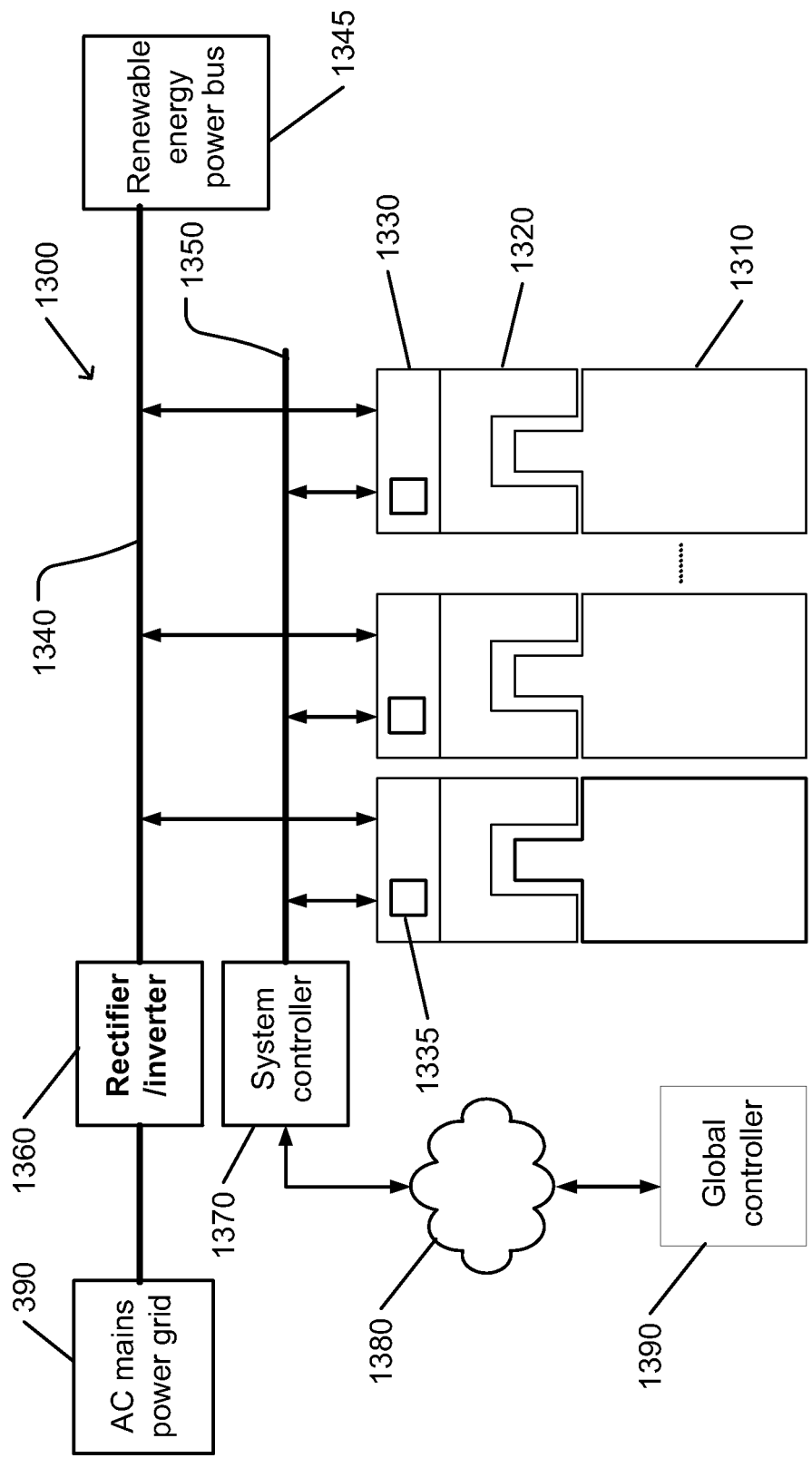
FIG. 17 schematically illustrates a flywheel energy storage system that includes a constant voltage DC bus, in accordance with an embodiment of the present invention.

FIG. 17 schematically illustrates a flywheel energy storage system that includes a constant voltage DC bus, in accordance with an embodiment of the present invention.

Constant DC voltage flywheel energy storage system 1300 includes a plurality of flywheel units 1310. Each flywheel unit 1310 is associated with motor/generator unit 1320 and controller/controller/inverter unit 1330.

For example, an associated flywheel unit 1310 and motor/generator unit 1320 may include an open frame flywheel/rotor within a vacuum enclosure, and a outside of the vacuum enclosure, as shown. Other configurations of flywheel units and motor/generator units may be used (e.g., a motor/generator unit whose rotor is magnetically coupled to a flywheel unit within a vacuum enclosure, or a motor/generator unit that is mechanically coupled to a flywheel unit and that is also enclosed within the vacuum enclosure).

Components of constant DC voltage flywheel energy storage system 1300 may be controlled a local system controller 1370 via control bus 1350. Alternatively or in addition, local system controller 1370 may be controlled by global controller 1390 via network 1380, which controls Components of constant DC voltage flywheel energy storage system 1300 via control bus 1350.

Each controller/inverter unit 1330 is connected to high voltage DC bus 1340. High voltage DC bus 1340 may connect to AC mains power grid 390 via rectifier/inverter 1360. In some cases, high voltage DC bus 1340 may be connected to one or more renewable energy sources via renewable energy power bus 1345. The DC voltage of high voltage DC bus 1340 may be kept constant. For example, the DC voltage of high voltage DC bus 1340 may have a value of approximately 650 V, or another value.

During a charge phase of operation, controller/inverter unit 1330 operates in a charge mode to convert DC current for high voltage DC bus 1340 to an AC voltage. For example, a DC bus voltage of 650 V may be converted to an AC voltage with amplitude of about 300 V for a flywheel rotational velocity of 20,000 rpm, or having an amplitude of about 600 V for a flywheel rotational velocity of 40,000 rpm. The AC voltage is fed to stator coils of motor/generator unit 1320 to create a torque to accelerate the flywheel of flywheel unit 1310.

During a discharge phase of operation, an AC voltage describable by a sine wave is induced within the stator coils of motor/generator unit 1320 operating in a discharge mode. The amplitude of the induced AC voltage is of similar magnitude to the amplitude of the AC voltage that is fed into the stator coils during the charge phase (e.g., 300 V with 20,000 rpm and 600 V with 40,000 rpm). Controller/inverter unit 1330 includes bridge circuit and pulse-width modulation (PWM) controller 1335. For example, bridge circuit and PWM controller 1335 may include an H-bridge circuit and a PWM control circuit. Controller/inverter unit 1330 utilizes the inductance of motor/generator unit 1320 to step up the voltage signal for feeding into high voltage DC bus 1340 in a current-limited mode. The current-limited mode causes the voltage of the output of controller/inverter unit 1330 to increase to a voltage level that enables current flow from controller/inverter unit 1330 to high voltage DC bus 1340 at a predetermined current level. With such current-limited operation, multiple inverter units 342 may concurrently feed power into a single high voltage DC bus 1340 without mutual interference. Local system controller 1370 may control a set point of current to be fed by controller/inverter unit 1330 to DC bus 1340. Thus, the rate of discharge of energy of a flywheel of each flywheel unit 1310 is controlled by local system controller 1370.

A constant DC voltage flywheel energy storage system 1300 that includes a constant voltage DC bus may be advantageous. For example, charging and discharging of multiple flywheel units 1310 (with the corresponding controller/inverter units 1330 operating in charge or discharge mode, respectively) that are connected to a single high voltage DC bus 1340 may be performed concurrently. A single controller/inverter unit 1330 supports both charging and discharging functions. Direct connection of high voltage DC bus 1340 to renewable energy power bus 1345 is enabled.

Constant DC voltage flywheel energy storage system 1300 may enable increased functional flexibility and resilience. For example, failure of an individual controller/inverter unit 1330 (except due to a short circuit) would not affect proper operation of the inverter units 1330. In contrast, a system configured for sequential operation, e.g., a system in which different flywheel units would provide power at different voltages, would limit power levels to that of an individual flywheel unit 1310.

The invention claimed is:

1. A flywheel energy storage system for storing electrical energy, the system comprising:
   a plurality of flywheels, each of the flywheels including a rotatable mass and a shaft, the flywheel being enclosed within an evacuable enclosure, the shaft supported by bearings on opposite sides of the rotatable mass, a rotor being fixed to the shaft in a cantilevered manner within the enclosure; and
   at least one electric motor/generator unit having a stator that is locatable outside of the enclosure of each flywheel of said plurality of flywheels and that is configured to be magnetically coupled to the rotor of one flywheel of said plurality of flywheels, the motor/generator unit being moveable to separately magnetically couple to the rotor of each flywheel of said plurality of flywheels.

2. The system of claim 1, comprising an engagement/disengagement mechanism to adjust a distance between the rotor and the stator.

3. The system of claim 1, wherein the flywheel comprises lead enveloped in a shell that comprises carbon fiber.

4. The system of claim 1, wherein the flywheel comprises a plurality of glass fibers, each fiber being at least partially wrapped around a column of a plurality of columns that are arranged in a circular pattern that is centered on an axis of rotation of the flywheel, such that each fiber extends substantially radially outward from the axis when the flywheel rotates.

5. The system of claim 1, wherein the flywheel includes a structure with an eccentric mass distribution that is rotatable to adjust a balance of the flywheel.

6. The system of claim 1, wherein a section of the enclosure between the rotor and the stator comprises glass.

7. The system of claim 1,
wherein the bearings comprise a mechanical bearing to continuously support a shaft of the rotating load so as to hold the shaft at a substantially fixed axis of rotation and a magnetic stabilization assembly including a plurality of electromagnets arranged around the shaft,
the system further comprising a control circuitry for controlling a resultant magnetic field generated by the electromagnets such that the magnetic field acts on a ferromagnetic element of the shaft to reduce imbalance forces acting on the shaft.

8. The system of claim 7, comprising a sensor to sense a vibration of the shaft, the control circuitry being configured to control the resultant magnetic field so as to minimize the sensed vibration.

9. The system of claim 1, wherein said at least one motor/generator unit comprises a plurality of the motor/generator units, the system further comprising:
a direct current (DC) bus:
a plurality of controller/inverters, each controller/inverter being electrically coupled to a motor/generator unit of said plurality of the motor/generator units and to the DC bus; and
a central controller to control each controller/inverter so as to set a discharge rate for each of the flywheels when its motor/generator unit is operating in a discharge mode, and to increase a voltage level of a voltage signal generated by the motor/generator unit in the discharge mode.

10. The system of claim 1, wherein a cap of the enclosure between the stator and the rotor comprises a magnetically susceptible material.

11. The system of claim 10, wherein the magnetically susceptible material comprises fiberglass.

12. The system of claim 10, wherein the magnetically susceptible material comprises a glass composite material.

13. The system of claim 1, wherein the distance between the stator and the rotor is substantially equal to 3 mm.

14. The system of claim 1, wherein the motor/generator unit comprises a DC motor.

* * * * *